United States Patent
Uesaka et al.

(10) Patent No.: US 12,543,185 B2
(45) Date of Patent: Feb. 3, 2026

(54) SYSTEM INFORMATION MESSAGE TRANSMISSION INDICATION

(71) Applicant: Telefonaktiebolaget LM Ericsson (PUBL), Stockholm (SE)

(72) Inventors: Kazuyoshi Uesaka, Kawasaki Kanagawa (JP); Muhammad Ali Kazmi, Sundbyberg (SE); Santhan Thangarasa, Vällingby (SE); Christopher Callender, Kinross (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 273 days.

(21) Appl. No.: 17/793,458

(22) PCT Filed: Feb. 12, 2021

(86) PCT No.: PCT/SE2021/050123
§ 371 (c)(1),
(2) Date: Jul. 18, 2022

(87) PCT Pub. No.: WO2021/162626
PCT Pub. Date: Aug. 19, 2021

(65) Prior Publication Data
US 2023/0060444 A1 Mar. 2, 2023

Related U.S. Application Data

(60) Provisional application No. 62/976,733, filed on Feb. 14, 2020.

(51) Int. Cl.
*H04W 72/23* (2023.01)
*H04W 48/10* (2009.01)

(52) U.S. Cl.
CPC .......... *H04W 72/23* (2023.01); *H04W 48/10* (2013.01)

(58) Field of Classification Search
CPC combination set(s) only.
See application file for complete search history.

(56) References Cited

U.S. PATENT DOCUMENTS

| 2017/0171841 | A1* | 6/2017 | Chen | H04L 1/1812 |
| 2018/0124685 | A1* | 5/2018 | Jha | H04W 4/70 |
| 2019/0082491 | A1* | 3/2019 | Shelby | H04W 76/28 |
| 2019/0215858 | A1* | 7/2019 | Ishii | H04W 48/14 |

(Continued)

FOREIGN PATENT DOCUMENTS

WO   2019 145494 A1   8/2019

OTHER PUBLICATIONS

3GPP TS 38.331 v15.8.0; Technical Specification; 3rd Generation Partnership Project; Technical Specification Group Radio Access Network; NR; Radio Resource Control (RRC) protocol specification (Release 15)—Dec. 2019.

(Continued)

*Primary Examiner* — Kibrom T Hailu
(74) *Attorney, Agent, or Firm* — Sage Patent Group

(57) ABSTRACT

A method by a wireless device includes obtaining (1202) scheduling information indicating at least one transmission occasion in which a system information message is transmitted for a cell during a system information transmission periodicity. The wireless device receives (1204) the system information message based on the scheduling information.

17 Claims, 15 Drawing Sheets

(56) References Cited

U.S. PATENT DOCUMENTS

| | | | | |
|---|---|---|---|---|
| 2019/0254110 A1* | 8/2019 | He | ...................... | H04L 41/0896 |
| 2020/0221428 A1* | 7/2020 | Moon | .................... | H04B 7/024 |
| 2020/0236692 A1* | 7/2020 | Lin | ....................... | H04L 5/0007 |
| 2020/0260415 A1* | 8/2020 | Li | ......................... | H04L 5/0091 |
| 2020/0288390 A1* | 9/2020 | Wang | .............. | H04W 36/00835 |
| 2021/0045098 A1* | 2/2021 | Bi | ...................... | H04W 68/005 |
| 2021/0329562 A1* | 10/2021 | Yu | ....................... | H04W 52/028 |
| 2022/0053571 A1* | 2/2022 | Lee | ................... | H04W 74/0866 |

OTHER PUBLICATIONS

3GPP TS 38.331 v16.0.0; Technical Specification; 3rd Generation Partnership Project; Technical Specification Group Radio Access Network; NR; Radio Resource Control (RRC) protocol specification (Release 16)—Mar. 2020.

PCT International Search Report issued for International application No. PCT/SE2021/050123—May 10, 2021.

PCT Written Opinion of the Internatinoal Searching Authority issued for International application No. PCT/SE2021/050123—May 10, 2021.

* cited by examiner

SYSTEM INFORMATION MESSAGE TRANSMISSION INDICATION

PRIORITY

This nonprovisional application is a U.S. National Stage Filing under 35 U.S.C. § 371 of International Patent Application Serial No. PCT/SE2021/050123 filed Feb. 12, 2021 and entitled "SYSTEM INFORMATION MESSAGE TRANSMISSION INDICATION" which claims priority to U.S. Provisional Patent Application No. 62/976,733 filed Feb. 14, 2020 both of which are hereby incorporated by reference in their entirety.

TECHNICAL FIELD

The present disclosure relates, in general, to wireless communications and, more particularly, systems and methods for system information (SI) message transmission indication.

BACKGROUND

System information (SI) provides user equipment (UEs) with essential information, such as cell access information and common radio resource configuration. A UE is required to acquire SI for a cell before making an attempt to access the cell.

SI consists of several information blocks. In New Radio (NR), the SI consists of master information block (MIB) and system information blocks (SIBs). There are several SIBs (e.g., SIB1, SIB2, . . . ) according to the information type.

For Radio Resource Control (RRC) connection release with redirection and RRC re-establishment, a UE needs to acquire MIB and SIB1 in order to know the Physical Random Access Channel (PRACH) resource information for the random access procedure. The SI acquisition time $T_{SI\text{-}NR}$ is given by:

$$T_{SI\text{-}NR} = T_{MIB\text{-}NR} + T_{SIB1\text{-}NR} + \Sigma_{x \in S}(k*T_{SIBx\text{-}NR,requestOn\text{-}Demand} + T_{SIBx\text{-}NR}),$$

where $T_{MIB\text{-}NR}$ is the MIB acquisition time, $T_{SIB1\text{-}NR}$ is the SIB1 acquisition time, $T_{SIBx\text{-}NR,requestOnDemand}$ is the SIBx acquisition time (where x depends on the procedures), and S is a set of system information block(s) required to complete the procedure (e.g., S=(2, 3)).

Some SI may also be provided on-demand (e.g., upon a request from a UE), for example based on Random Access Channel (RACH) or RRC, so an additional delay for requesting the on-demand SI may occur prior to receiving the on-demand SI. In the equation above, $T_{SIBx\text{-}NR,requestOnDemand}>0$ is a delay when SIBx is provided on demand and the UE needs to send a request for it; otherwise it is 0. The delay may comprise any delay in the procedure prior to the UE being able to receive the SI itself (e.g., delay due to uplink (UL) request or delay due to receiving the Acknowledgement (ACK) for the request and/or scheduling information for the on-demand SI). In some cases, one request may indicate the need for more than one on-demand SIBs, in which case the corresponding time needs to be counted only once (e.g., k=0 if it is requested with another SIB and is already accounted in the equation above, otherwise it is 1).

MIB is transmitted on Physical Broadcast Channel (PBCH) with SSB-based Measurement Timing Configuration (SMTC) periodicity (or Synchronization Signal and PBCH Block (SSB) period). SMTC periodicity is configurable by the network and it may be 5, 10, 20, 40, 80, and 160 ms. One example of MIB information is the timing information for when the MIB is transmitted. Examples of MIB information include:
- the system frame number (SFN);
- a part of the SS/PBCH block start position where MIB is transmitted within the SS burst (remaining SSB block index);
- if SSB block is transmitted in the first half of radio frame or second half of radio frame (half-frame timing); and/or
- information of SIB1 scheduling The MIB transmit time interval (TTI) or MIB periodicity is 80 ms. This means the MIB information may change every 80 ms except for the SFN. Since the SFN changes every 10 ms, the information bits corresponding to SFN change depending on the transmitted SFN. FIG. 1 illustrates an example of MIB transmission. For example, if the UE can acquire MIB with 5 PBCH samples, the MIB acquisition time is given by:

$$T_{MIB\text{-}NR} = 5 \times 20 \text{ ms} = 100 \text{ ms}.$$

SIB1 is transmitted on the Physical Downlink Shared Channel (PDSCH) with a periodicity of 160 ms (called SIB1 transmission periodicity, or SIB1 TTI) and variable transmission repetition periodicity within 160 ms. The default transmission repetition periodicity of SIB1 is 20 ms but the actual transmission repetition periodicity is up to network implementation. This means that the network can decide when it transmits SIB1. For SSB and Control Resource Set (CORESET) multiplexing pattern 1, where the network transmits SSB and SIB1 in the same time but in different frequency, the SIB1 repetition transmission period is 20 ms. For SSB and CORESET multiplexing pattern 2/3, where the network transmits SSB and SIB1 in different time, the SIB1 transmission repetition period is the same as the SSB period (or SMTC period).

SIB1 includes information regarding the availability and scheduling (e.g., mapping of SIBs to SI message, periodicity, SI-window size) of other SIBs with an indication of whether one or more SIBs are only provided on-demand, and, in that case, the configuration needed by the UE to perform the SI request. FIG. 2 illustrates an example of SIB1 transmission.

PDSCH conveying SIB1 is scheduled by the Physical Downlink Control Channel (PDCCH) with System Information Radio Network Temporary Identifier (SI-RNTI). When a UE needs to acquire SIB1, the UE monitors PDCCH with SI-RNTI every possible SIB1 transmission occasion. If the UE finds PDCCH with SI-RNTI, then the UE decodes the downlink control information (DCI) in PDCCH and acquires the PDSCH scheduling information such as resource block size, modulation, coding rate, and redundancy version.

Since the network does not change SIB1 information at least for SIB1 transmission periodicity (or SIB1 TTI) of 160 ms, if the network transmits SIB1 with the same resource block size, modulation, and coding rate, it is possible to do the soft-combining of PDSCH symbols prior to PDSCH decoding. Moreover, if the network does not change SIB1 information across the SIB1 transmission periodicity, it is also possible to do the soft-combining of PDSCH symbols across the SIB1 transmission periodicity.

For example, if the UE can acquire SIB1 with 5 PDSCH samples in the case of the SIB1 repetition transmission period of 20 ms, the SIB1 acquisition time is given by:

$$T_{SIB1\text{-}NR} = 5 * 20 \text{ ms} = 100 \text{ ms}.$$

Unlike SIB1, scheduling of other system information (such as SIB2 or SIB3) is configured by the network and the scheduling information is signaled in SIB1. The scheduling information for on-demand SIB may be provided separately upon UE request.

According to the 3$^{rd}$ Generation Partnership Project (3GPP) TS 38.331 v. 15.8.0, SIBs other than SIB1 (e.g., SIBx) are transmitted on the PDSCH. Each SI message is transmitted within periodically occurring time domain windows (referred to as SI-windows or SI transmission periodicity). Each SI message is associated with an SI-window and the SI-windows of different SI messages do not overlap. That is, within one SI-window only the corresponding SI message is transmitted. An SI message may be transmitted a number of times within the SI-window.

PDSCH conveying SIBx is scheduled by PDCCH with SI-RNTI. When a UE needs to acquire SIBx, the UE monitors PDCCH with SI-RNTI scheduled by PDCCH monitoring occasions for SI message (i.e., PDCCH search space for SI). Note that it is possible to schedule one or more PDCCH monitoring occasions within one SI-window.

If the UE finds PDCCH, the UE decodes DCI in PDCCH and acquires the PDSCH scheduling information such as resource block size, modulation, coding rate, and redundancy version.

FIG. 3 illustrates an example of SIBx transmission, where SI window size is 20 slots and SI periodicity is 16 radio frames (=160 ms). In this example, there are three PDCCH monitoring occasions within one SI window.

Since the network does not change SIBx information at least during SI periodicity (e.g., 160 ms in FIG. 3), if the network transmits SIBx with the same resource block size, modulation, and coding rate, it is possible to perform soft-combining prior to decoding as well as SIB1 acquisition.

For example, if the UE can decode SIBx with the 4 PDSCH occasions and SIBx is transmitted every 10 ms, then the SIBx acquisition time is given by:

$$T_{SIBx-NR}=4\times10\ ms=40\ ms.$$

There currently exist certain challenges. As one example, a UE does not know the actual SIB1 message transmissions within the SIB1 transmission periodicity of 160 ms. According to the 3GPP specification, a UE needs to check the SIB1 transmission every-possible SIB1 transmission. For instance, 3GPP specifies the SIB1 repetition transmission period is 20 ms by default. If the network transmits SIB1 only in the last transmission occasion, the UE needs to decode PDCCH 7 times unnecessarily to check the transmission of SIB1 within the SIB1 transmission periodicity. This is problematic, because it consumes the UE battery.

Similarly to SIB1 scheduling, a UE does not know at which points the other SIBx message transmissions will actually occur within the SI window. According to the 3GPP specification, a UE needs to check for SIBx transmission at every possible SIBx transmission occasion (i.e., according to PDCCH search space configured for the SIBx). If the network configures 10 SIBx transmission occasions but it transmits SIBx only in the last transmission occasion, the UE needs to decode PDCCH 9 times unnecessarily to check the transmission of SIBx within the SI window. This is problematic, because it consumes the UE battery.

Additionally, the network does not know the expected SI acquisition time if it requests the UE to read the SI message. The network can configure the SIB1/SIBx scheduling and has knowledge of the configuration, but the UE does not know the actual SIB1/SIBx transmission occasions. In the worst case some UEs do not attempt to soft combine the PDSCH (single shot SI receiver) and it results in a longer SI acquisition time (compared with UEs capable of soft-combining PDSCH symbols). If the network plans the network based on the worst (e.g., longest) SI acquisition time derived from the single shot SI receiver, it reduces the whole system performance, especially if the SI decoding result is needed for a time critical operation such as handover. In addition, the single shot-SI receiver will result in additional UE battery consumption from having some or many failed attempts (on average) to decode the SI before it is successful.

SUMMARY

Certain aspects of the present disclosure and their embodiments may provide solutions to these or other challenges. According to certain embodiments, when the network requests a wireless device such, as a user equipment (UE) to acquire system information (SI) of its own cell or a neighboring cell, the network transmits information about the SI scheduling information (e.g., bitmaps of SIB1 transmission occasions over SIB1 transmission period or SIB1 TTI) in advance indicating in which transmission occasion the SI message is transmitted from the network node.

According to certain embodiments, a method by a wireless device includes obtaining scheduling information indicating at least one transmission occasion in which a system information message is transmitted for a cell during a system information transmission periodicity. The wireless device receives the system information message based on the obtained scheduling information.

According to certain embodiments, a wireless device includes processing circuitry configured to obtain scheduling information indicating at least one transmission occasion in which a system information message is transmitted for a cell during a system information transmission periodicity. The processing circuitry is configured to receive the system information message based on the obtained scheduling information.

According to certain embodiments, a method by a network node includes signalling, to a wireless device, scheduling information indicating at least one transmission occasion in which a system information message is transmitted for a cell during a system information transmission periodicity. The network node transmits the system information message in the at least one transmission occasion based on the scheduling information.

According to certain embodiments, a network node includes processing circuitry configured to signal, to a wireless device, scheduling information indicating at least one transmission occasion in which a system information message is transmitted for a cell during a system information transmission periodicity. The processing circuitry is configured to transmit the system information message in the at least one transmission occasion based on the scheduling information.

Certain embodiments may provide one or more of the following technical advantages. As one example, certain embodiments may enable the network to predict the SI acquisition time based on the SI message scheduling. This is advantageous, because the network does not need to assume the worst-case scenario (i.e., longest SI acquisition time), which improves the network performance. As another example, in certain embodiments, the UE does not need to receive and decode all the configured Physical Downlink Control Channel (PDCCH) search space for SI message scheduling where the network does not schedule indicated by the bitmap. This can advantageously avoid UE power consumption. As still another example, with certain embodiments the UE can attempt to soft combine Physical Downlink Shared Channel (PDSCH) even if the network transmits only one SI message within the SI transmission periodicity, which not only reduces the SI acquisition time, but also saves the UE battery because the soft-combing SI receiver takes shorter reception time compared with the single-shot SI receiver especially in the cell edge. As yet another example, in certain embodiments the network does not need to transmit SIB1 frequently (e.g., 20 ms), which can advantageously reduce the network overhead. As another example, certain of the example embodiments described herein may be particularly useful for low complexity UE (e.g., Reduced capability (Redcap) UE and/or Machine-Type Communication (MTC) etc.), since the method allows reduction in the UE power consumption and/or reduction in the SI acquisition delay when acquiring the SI of the cell (e.g., SIB1).

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
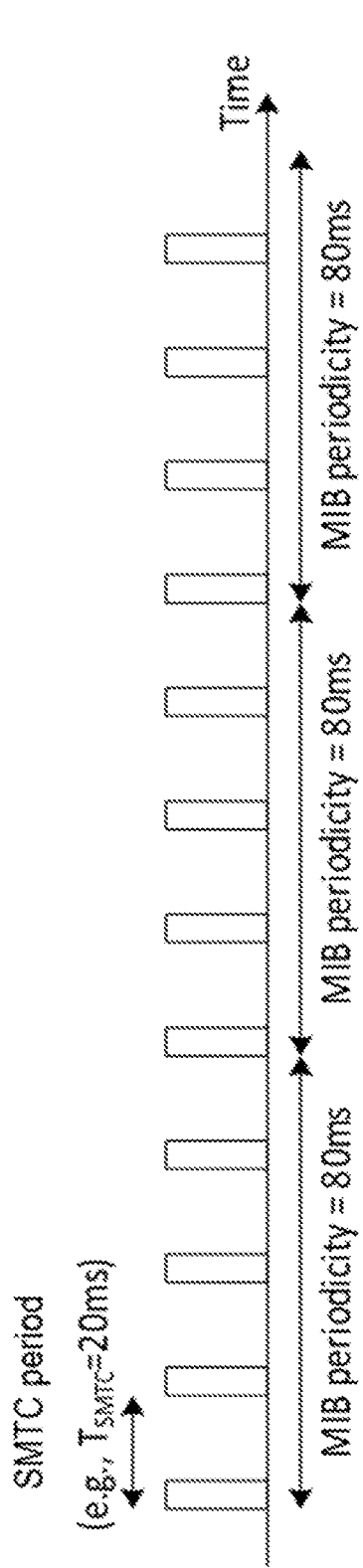
FIG. 1 illustrates an example of Master Information Block (MIB) transmission.
Figure 2:
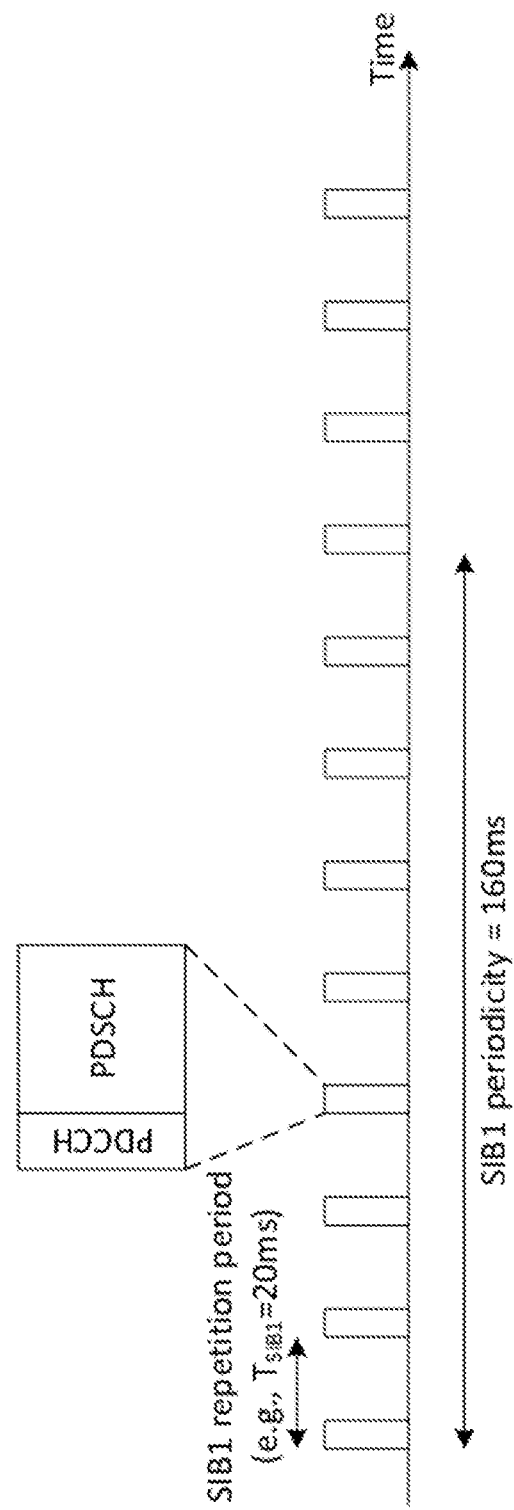
FIG. 2 illustrates an example of Type 1 System Information Block (SIB1) transmission.
Figure 3:
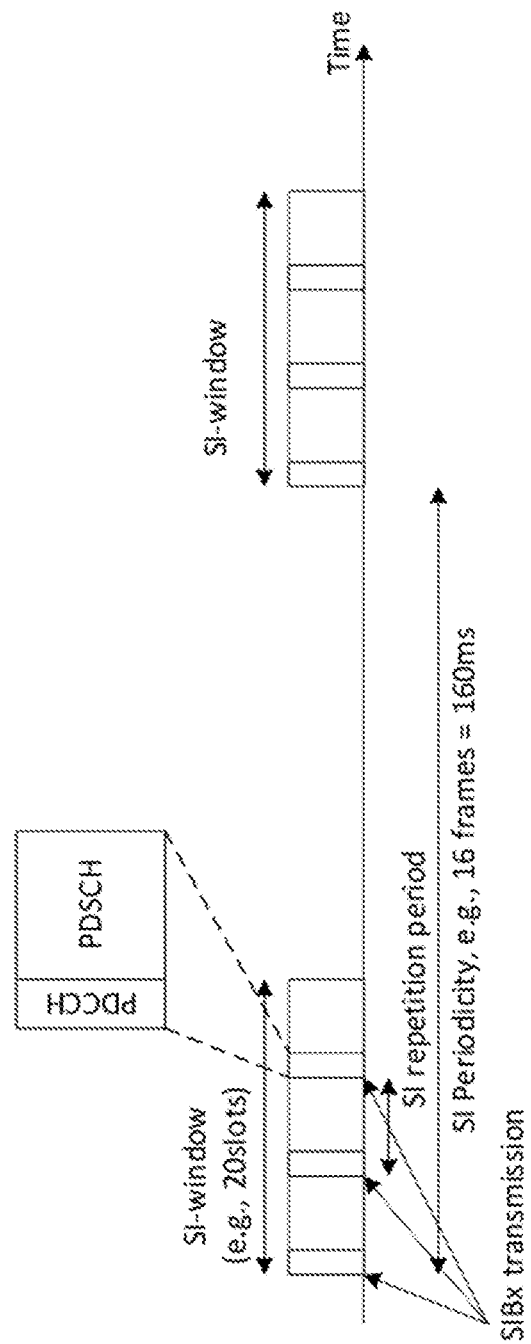
FIG. 3 illustrates an example of SIBx transmission, where SI window size is 20 slots and SI periodicity is 16 radio frames (=160 ms)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the present disclosure, the term node is used which can be a network node or a UE. Examples of network nodes include NodeB, base station (BS), multi-standard radio (MSR) radio node such as MSR BS, eNodeB, gNodeB, MeNB, SeNB, integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, remote radio unit (RRU), remote radio head (RRH), nodes in distributed antenna system (DAS), core network node (e.g., Mobile Switching Centre (MSC), Mobility Management Entity (MME), etc.), Operation and Maintenance (O&M), Operations Support System (OSS), Self-Optimized Network (SON), positioning node (e.g., Evolved Serving Mobile Location Centre (E-SMLC), etc.

Another example of a node is UE, which is a non-limiting term and refers to any type of wireless device communicating with a network node and/or with another UE in a cellular or mobile communication system. Examples of UE include target device, device to device (D2D) UE, vehicular to vehicular (V2V), machine type UE, MTC UE or UE capable of machine to machine (M2M) communication, PDA, Tablet, mobile terminals, smart phone, laptop embedded equipment (LEE), laptop mounted equipment (LME), USB dongles etc.

In some embodiments, generic terminology, "radio network node" or simply "network node (NW node)", is used.

It can be any kind of network node which may comprise base station, radio base station, base transceiver station, base station controller, network controller, evolved Node B (eNB), Node B, gNodeB (gNB), relay node, access point, radio access point, Remote Radio Unit (RRU) Remote Radio Head (RRH), Central Unit (e.g. in a gNB), Distributed Unit (e.g. in a gNB), Baseband Unit, Centralized Baseband, C-RAN, access point (AP), etc.

The term radio access technology (RAT) may refer to any RAT, for example UTRA, E-UTRA, narrow band internet of things (NB-IoT), WiFi, Bluetooth, next generation RAT, New Radio (NR), 4G, 5G, etc. Any of the equipment denoted by the terms node, network node or radio network node may be capable of supporting a single or multiple RATs.

As user herein, the term signal can be any physical signal or physical channel. Examples of physical signals are reference signal such as Primary Synchronization Signal (PSS), Secondary Synchronization Signal (SSS), Channel State Information Reference Signal (CSI-RS), Demodulation Reference Signal (DMRS), signals in SSB, Cell Specific Reference Signal (CRS), Positioning Reference Signal (PRS), Sounding Reference Signal (SRS), etc. The term physical channel used herein is also called as 'channel', which contains higher layer information. Examples of physical channels are MIB, PBCH, Narrowband PBCH (NPBCH), PDCCH, PDSCH, short Physical Uplink Control Channel (sPUCCH), short PDSCH (sPDSCH), short Physical Uplink Shared Channel (sPUSCH), MTC PDCCH (MPDCCH), Narrowband PDCCH (NPDCCH), Narrowband PDSCH (NPDSCH), Enhanced PDCCH (E-PDCCH), Physical Uplink Shared Channel (PUSCH), Physical Uplink Control Channel (PUCCH), Narrowband PUSCH (NPUSCH), etc.

As used herein, the term time resource may correspond to any type of physical resource or radio resource expressed in terms of length of time. Examples of time resources include: symbol, time slot, subframe, radio frame, TTI, interleaving time, etc. As used herein, the term TTI may correspond to any time period (TO) over which a physical channel can be encoded and optionally interleaved for transmission. The physical channel is decoded by the receiver over the same time period (TO) over which it was encoded. The TTI may also be interchangeably referred to as short TTI (sTTI), transmission time, slot, sub-slot, mini-slot, mini-subframe etc.

As used herein, the term time-frequency resource refers to any radio resource defined in any time-frequency resource grid in a cell. Examples of time-frequency resource include resource block, subcarrier, resource block (RB), etc. An RB may also be interchangeably referred to as physical RB (PRB), virtual RB (VRB), etc.

Scenario for SI Acquisition

The various embodiments described herein may be applicable to a variety of scenarios. As one example, certain embodiments may be applicable to a scenario in which a UE is served by a first cell (cell1), which in turn is managed or served or operated by a first network node (NN1). The UE is further configured to acquire the SI of a second cell (cell2), which in turn is managed or served or operated by a second network node (NN2). The UE can be configured to acquire the SI of cell2 based on a trigger, which may be associated with a procedure (e.g., Cell Global Identification (CGI) reading, cell reselection, handover, measurement, RRC connection re-establishment, RRC release with redirection, SON, positioning, acquisition of SFN, while performing specific type of measurement (e.g., SFN and frame timing difference (SFTD), Reference Signal Time Difference (RSTD) etc.) etc.). The UE can be configured to acquire the SI based on a message received from NN1 or autonomously by the UE. In the latter case, the trigger can be due to certain procedure(s) in the UE (e.g., cell reselection, RRC connection re-establishment, etc.). Cell2 may also be referred to as a target cell, or any cell whose SI is to be acquired by the UE. In certain embodiments, cell1 and cell2 can be the same and NN1 and NN2 are the same. For example, if the cell has updated the contents of SI message; all the UEs under this cell need to acquire SI again to update the SI information.

The actual components or blocks of the SI of cell2 acquired by the UE may depend on the type of the procedure:

In one example, the UE may be required to acquire MIB and SIB1 for certain types of measurements involving cell2 (e.g., cell selection or reselection to cell2, CGI reading of cell2, RRC re-establishment to cell2, positioning, SON, etc.).

In another example, the UE may be required to acquire MIB, SIB1 and one or more SIBs other than SIB1 for certain types of measurements involving cell2 (e.g., cell reselection to cell2, positioning, SON, etc.).

In yet another example, the UE may be required to acquire any one or more of: MIB, SIB1, and one or more other SIBs.

In yet another example, the UE may be required to acquire on-demand SI only or in combination with any of the above.

In yet another example, the UE may be required to acquire MIB and SIB1 for Automatic Neighbour Relation (ANR) purpose (i.e., for obtaining information about neighbor cells/nodes).

Yet another example of time critical SI acquisition from the serving cell (cell 2 and cell 1 are the same) is the reception of public warning system (PWS) information from SIB6, 7 or 8, which correspond to Earthquake and Tsunami Warning System (ETWS) primary notification, ETWS secondary notification, and Commercial Mobile Alert System (CMAS) warning notification respectively.

The SI may consist of several information blocks. In NR, the SI includes MIB and SIBs. There are several SIBs (e.g., SIB1, SIB2, . . . ) according to the information type. Even though the embodiments described herein are mainly elaborated for examples related to SIB1, it should be understood that the various embodiments described herein are applicable to any type of SI information block.

According to certain embodiments, for example, when the network requests a UE to acquire SI of its own cell or a neighboring cell, the network transmits information about the SI scheduling information (e.g., bitmaps of SIB1 transmission occasions over SIB1 transmission period or SIB1 TTI) in advance indicating in which transmission occasion the SI message is transmitted from the network node. In one example embodiment, the transmitted information about the SI scheduling information can be cell-specific (e.g., a bit map of SIB1 over SIB1 TTI in a target cell). In another example embodiment, the transmitted information about the SI scheduling information can be carrier frequency specific (i.e., common for all or a group of cells on a certain carrier frequency), for example a common bit map of SIB1 over SIB1 TTI for all or a group of cells on F1.

In certain embodiments, if the network node indicates M or less SI message transmissions within the SI message transmission periodicity (e.g., M=1), the network may transmit the same SI information across the SI message transmission periodicity so that the UE can attempt to soft combine the PDSCH symbols across the multiple SI message transmission periods.

In certain embodiments, based on the provided SI message about the SI scheduling (e.g., SI transmission bitmaps), the UE can configure the receiver algorithm so that it attempts to soft combine the PDSCH symbols.

In some cases, the network expects that the UE acquires the SI within the SI acquisition time $T_{S1}$, based on the SI transmission scheduling in a target cell (e.g., cell2). This means the time ($T_{S1}$) required by the UE to acquire the SI depends on the SI transmission scheduling (e.g., contents of bit map of SIB1 occasions over the SIB1 TTI) over the SI transmission period. In certain embodiments, a parameter N defines a number of occasions within the SI transmission period in which the SI transmission is scheduled (i.e., actually transmitted). A threshold (Nt) can be specified, for example Nt is the minimum number of SI (e.g., SIB1 over PDSCH) transmissions within the SI transmission period necessary to get sufficient probability of decoding the SI using soft combining. For example, if the number (N) of bits in the bitmap is less than Nt (e.g., Nt=2), then the network expects that the UE acquires the SI of cell2 within $T_{S1}$=T1. If the number (N) of bits in the bitmap is greater than or equal to Nt, then the network assumes that the UE acquires the SI of cell2 within $T_{S1}$=T2, where T1>T2. According to another rule, in certain embodiments if the UE is not configured with the information about the SI transmission scheduling (i.e., no bitmap is signaled), then the UE is allowed to acquire the SI of cell2 within T1. But if the UE is configured with the information about the SI transmission scheduling (i.e., bitmap is signaled) and N≥Nt, then the UE is allowed to acquire the SI of cell2 within T2.

There are, proposed herein, various embodiments which address one or more of the issues disclosed herein. According to one example embodiment, a method performed by a wireless device for acquiring system information is disclosed. The method comprises obtaining scheduling information for a system information message associated with a cell. The method comprises receiving the system information message based on the obtained scheduling information.

In certain embodiments, the method may comprise reporting the received system information message.

In certain embodiments, the system information message may comprise one of: a master information block (MIB); and a system information block (SIB). In certain embodiments, the system information message may be system information block type 1 (SIB1).

In certain embodiments, obtaining the scheduling information may comprise receiving the scheduling information from a first cell. The scheduling information may be associated with a system information message of the first cell. The scheduling information may be associated with a system information message of a second cell.

In certain embodiments, the method may further comprise determining to acquire the system information message. In certain embodiments, the step of determining to acquire the system information message may be performed in response to receiving a system information message acquisition request.

In certain embodiments, the wireless device may autonomously determine to acquire the system information message in response to a trigger. The trigger may comprise one of: a cell re-selection procedure; and radio resource control connection re-establishment.

In certain embodiments, the scheduling information for the system information message may comprise a system information message scheduling bitmap. In certain embodiments, the system information message scheduling bitmap may comprise a number of bits equal to a number of system information message transmission occasions within a system information window. A bit value of each bit may indicate whether the system information message is transmitted in a corresponding system information message transmission occasion. In certain embodiments, a bit value of 1 may indicate that the system information message is transmitted in a corresponding system information message transmission occasion. A bit value of 0 may indicate that the system information message is not transmitted in a corresponding system information message transmission occasion. In certain embodiments, a bit value of 0 may indicate that the system information message is transmitted in a corresponding system information message transmission occasion. A bit value of 1 may indicate that the system information message is not transmitted in a corresponding system information message transmission occasion.

In certain embodiments, receiving the system information message based on the obtained scheduling information may comprise decoding a PDCCH for the system information message according to the scheduling information. In certain embodiments, the method may further comprise: determining that PDSCH scheduling information is included in the PDCCH; receiving the PDSCH; and attempting to decode the PDSCH at a first system information message transmission occasion. In certain embodiments, the method may further comprise in response to decoding the PDSCH at the first system information message transmission occasion, acquiring the system information message. In certain embodiments, the method may further comprise in response to not decoding the PDSCH at the first system information message transmission occasion, determining whether there are other system information message transmission occasions within a transmission periodicity of the system information message. In certain embodiments, the method may further comprise: in response to determining that there are other system information message transmission occasions within the transmission periodicity of the system information message, storing one or more received PDSCH symbols in a buffer; receiving PDSCH in a subsequent system information message transmission occasion within the transmission periodicity of the system information message; soft combining the stored one or more received PDSCH symbols with one or more PDSCH symbols received in the subsequent system information message transmission occasion; and attempting to decode the PDSCH using the soft-combined PDSCH symbols.

In certain embodiments, the method may further comprise in response to determining that the PDSCH cannot be decoded using the soft-combined PDSCH symbols, storing the one or more received PDSCH symbols and the one or more PDSCH symbols received in the subsequent system information message transmission occasion in the buffer. In certain embodiments, the method may further comprise: determining that there are no other system information message transmission occasions within the transmission periodicity of the system information message; and determining whether or not to clear the buffer. In certain embodiments, the determination of whether or not to clear the buffer may be based on the obtained scheduling information.

In certain embodiments, the method may further comprise: determining, based on the obtained scheduling information, that a number of system information message transmission occasions within the transmission periodicity of the system information message is below a threshold; and in response to determining that the number of system information message transmission occasions within the transmission periodicity of the system information is below the threshold, determining not to clear the buffer.

In certain embodiments, the method may further comprise: determining, based on the obtained scheduling information, that a number of system information message transmission occasions within the transmission periodicity of the system information message is above a threshold; and in response to determining that the number of system information message transmission occasions within the transmission periodicity of the system information is above the threshold, determining to clear the buffer. In certain embodiments, the threshold may be fixed. In certain embodiments, the threshold may be a function of one or more of: a system information message payload; a modulation and coding scheme; a-transmission bandwidth; and a coding rate.

In certain embodiments, the method may further comprise: acquiring cell-specific system information scheduling information for a cell that is not serving the wireless device; and using the acquired cell specific system information scheduling information for one or more tasks. In certain embodiments, acquiring the cell-specific system information scheduling information for the cell that is not serving the wireless device may comprise: attempting to decode all possible occasions where a system information message of the non-serving cell can be transmitted; and creating a bit map indicating occasions when the system information message is transmitted.

In certain embodiments, the obtained scheduling information may comprise a common system information message scheduling bitmap for a group of cells operating on a given carrier frequency.

In certain embodiments, the method may further comprise: providing user data; and forwarding the user data to a host computer via a transmission to a network node.

According to another example embodiment, a method performed by a network node for indicating system information transmission is disclosed. The method comprises signaling scheduling information for a system information message to a wireless device. The method comprises requesting that the wireless device acquire the system information message.

In certain embodiments, the method may further comprise receiving a report from the wireless device, wherein the report is related to the acquired system information message.

In certain embodiments, the scheduling information for the system information message may comprise: a transmission periodicity of the system information message; and a number of transmission occasions within the transmission periodicity of the system information message.

In certain embodiments, the method may further comprise determining the scheduling information for the system information message, wherein the scheduling information for the system information message is associated with at least one cell.

In certain embodiments, determining the scheduling information for the system information message may comprise obtaining system information scheduling information from one or more neighboring cells.

In certain embodiments, the scheduling information for the system information message may comprise common system information scheduling information for a group of cells operating on a given carrier frequency.

In certain embodiments, signaling the scheduling information for the system information message to the wireless device may comprise signaling an indication of the scheduling information for the system information message to the wireless device.

In certain embodiments, the indication of the scheduling information for the system information may comprise a system information message scheduling bitmap. The system information message scheduling bitmap may comprise a common system information message scheduling bitmap for a group of cells operating on a given carrier frequency. In certain embodiments, the system information message scheduling bitmap may be a function of cell-specific system information message scheduling bitmaps of the group of cells.

In certain embodiments, the system information message scheduling bitmap may comprise a number of bits equal to a number of system information message transmission occasions within the transmission periodicity of the system information message. A bit value of each bit may indicate whether the system information message is transmitted in a corresponding system information message transmission occasion. In certain embodiments, a bit value of 1 may indicate that the system information message is transmitted in a corresponding system information message transmission occasion. A bit value of 0 may indicate that the system information message is not transmitted in a corresponding system information message transmission occasion. In certain embodiments, a bit value of 0 may indicate that the system information message is transmitted in a corresponding system information message transmission occasion. A bit value of 1 may indicate that the system information message is not transmitted in a corresponding system information message transmission occasion.

In certain embodiments, the method may further comprise generating the indication of the determined scheduling information for the system information message. In certain embodiments, the method may further comprise obtaining the indication of the determined scheduling information for the system information message from another network node.

In certain embodiments, the method may further comprise one or more of: obtaining scheduling information from a plurality of different network nodes; and obtaining scheduling information from one or more wireless devices.

In certain embodiments, the scheduling information for the system information message may be based on a type of service provided. In certain embodiments, the scheduling information for the system information message may be based on a type of deployment of a target cell. In certain embodiments, the scheduling information for the system information message may be based on a triggering event.

In certain embodiments, the scheduling information for the system information message may comprise an indication of whether the scheduling information for the system information message is the same as one or more neighboring cells. In certain embodiments, the scheduling information for the system information message may comprise an indication of whether the scheduling information is the same on one or more carrier frequencies as transmitted in a reference frequency.

In certain embodiments, the scheduling information for the system information message may be signaled to the wireless device using system information. In certain embodiments, the scheduling information for the system information message may be signaled to the wireless device in a wireless-device specific message.

In certain embodiments, the scheduling information for the system information message may indicate a number of transmission occasions within the transmission periodicity of the system information message that are used for transmitting the system information message. In certain embodiments, the scheduling information for the system information message may indicate a number of transmission occasions within the transmission periodicity of the system information message that are not used for transmitting the system information message.

In certain embodiments, the method may further comprise sending information about an amount of time that the signaled indication of the determined scheduling information is valid.

In certain embodiments, the request that the wireless device acquire the system information message may be associated with one of the following procedures: a CGI information report; RRC connection release with redirection to a carrier operating in a target cell; an ANR purpose; other system information message acquisition; a cell change; a positioning measurement; a system frame number and frame timing difference measurement; and reception of public warning system information.

In certain embodiments, the network node may be associated with a first cell, and the method may further comprise instructing the wireless device to acquire information about cell-specific system information scheduling information for a second cell.

In certain embodiments, the method may further comprise starting a timer after requesting that the wireless device acquire the system information message, wherein the timer corresponds to an amount of time in which the wireless device is expected to complete the request. A value of the timer may comprise a delay corresponding to a system information acquisition delay.

In certain embodiments, the system information message may comprise one of: a master information block (MIB); and a system information block (SIB). In certain embodiments, the system information message may be system information block type 1 (SIB1).

In certain embodiments, the method may further comprise: obtaining user data; and forwarding the user data to a host computer or a wireless device.

Method in Network Indicating the SIB Transmission

Step 1: SI Transmission Scheduling

There are several examples of SI transmission scheduling. For SIB1 scheduling, one scenario is when the cell configures to transmit SIB1 and SSB in the different time (also known as SSB and CORESET multiplexing pattern 1). For example, if the cell has enough radio resources (i.e., resource blocks and/or it is the cell where the UE tries to connect at the initial cell search) it schedules SIB1 with the default transmission repetition periodicity specified in 3GPP TS38.331 (i.e., 20 ms). In another example of the SSB and CORESET multiplexing pattern 1, if the cell1 has less radio resources due to the limited channel bandwidth, it schedules SIB1 only a few times within the SIB1 transmission period of 160 ms. For example, the first and second occasions within the SIB1 transmission period.

Another scenario is when the cell configures to transmit SIB1 and SSB in the same time (also known as SSB and CORESET multiplexing pattern 2/3). One example of this scenario is that the cell schedules SIB1 transmission exactly at the same time as SSB transmissions (e.g., every 5 ms, 10 ms, 20 ms, 40 ms, 80 ms or 160 ms). Another example is to schedule SIB1 transmission less frequently than SSB transmission (e.g., every 80 ms even if SSB is transmitted every 40 ms).

For other SI messages (e.g., SIBx) scheduling, one example is to schedule SIBx message every SIBx transmission occasions configured with the PDCCH search space, within the SI window. Another example is to schedule SIBx less often compared with the configured PDCCH search space (e.g., every other transmission occasion or only first occasion within the SI window).

Neighboring cells share their SI scheduling information each other. For example, the cell1 knows the SI information block (e.g., SIB1) scheduling information of the cell2 which is next to the cell1, and both cells operate with the same carrier frequency (e.g., the same frequency channel number such as absolute radio frequency channel number (ARFCN)). Examples of ARFCN are NR-ARFCN, GSCN, etc. To share the SI information block (e.g., SIB1) scheduling information, the cell1 and cell2 exchange their SI information block (e.g., SIB1) scheduling information via or through the interface between them. Another example for sharing is to set the common SI information block (e.g., SIB1) scheduling information for both cell1 and cell2 with, for example, the system parameters stored in the memory in the network node. In one example, the SI scheduling information of the SI information block (e.g., SIB1) can be expressed in terms of a bit map. By using this mechanism each cell (e.g., cell1) contains a common SI scheduling information (e.g., bit map) for each type of SI information block transmitted by a group of cells operating on the same carrier frequency.

If the cell schedules $M_{SIB1}$ or less SIB1 messages within the SIB1 transmission periodicity of 160 ms, (e.g., $M_{SIB1}=1$), the cell does not change the SIB1 message payload for a period (e.g., 10 seconds). If the cell schedules $M_{SIBx}$ SIBx messages within the corresponding SI window (e.g., $M_{SIBx}=2$), the cell does not change, the SIBx message payload over the several SI windows (e.g., 10×SI periodicity).

Examples of generating common SI information block per carrier in a network node are now discussed. In one example, SI scheduling information representing a SI information block in a group of cells on the same carrier frequency can be denoted by a vector, $B^F_{ijk}$, where:

$$B^F_{ijk}=(b^F_{ijk}),$$

and where: i denotes a SI block type i (e.g., SIB1), where i≤5 P e.g. P=32, the maximum number of SI block types; j denotes length of SI scheduling information in terms of number of repetition or transmission of the SI block within the TTI of the SI (e.g., number of transmission occasions within the TTI of SI information block type i), where j≤Q e.g. Q=32, the maximum number of repetitions of the SI within the TTI or SI transmission period; k denotes a carrier frequency of cells transmitting the SI information block type i with SI scheduling information of length j, where k≤R e.g. R=16; and b∈{0, 1}.

In certain embodiments, the network node may create the SI scheduling information ($B^F_{ijk}$) for certain SI information block based on a function, g(.), of individual (cell specific) bit maps ($B^c_{ijkl}$) for certain SI information block. The cell specific SI scheduling information representing an SI information block in a cell on certain carrier frequency can be denoted by a vector, $B^C_{ijkl}$, where:

$$B^C_{ijkl}=\{b^C_{ijkl}\},$$

and where l denotes a cell on carrier frequency k transmitting the SI information block type i with SI scheduling information of length j, where l≤S e.g. S=1008.

A general example of the function, g(.), creating or generating the carrier specific SI scheduling information (e.g., common) from cell specific (individual) SI scheduling information of the SI information can be expressed as follows:

$$B^F_{ijk} = g(B^C_{ijk1}, B^C_{ijk2}, \ldots, B^C_{ijkS})$$

One specific example of the function creating or generating the carrier specific SI scheduling information (e.g., common for the carrier) from cell specific (individual) bit maps of the SI information can be expressed as intersection (denoted by ∩) of the individual SI scheduling information (e.g., cell specific) of each cell on the same carrier as follows:

$$B^F_{ijk} = B^C_{ijk1} \cap B^C_{ijk2} \cap, \ldots, \cap B^C_{ijkS}$$

A specific example of the SI scheduling information comprises a bit map where each bit represents whether the SI information (e.g., occasion or redundancy version of the SI block) is transmitted or not (e.g., 0 means not transmitted and 1 means transmitted or vice versa). One specific example of the function creating or generating the carrier specific (common) bit map from cell specific (individual) bit maps of the SI information can be expressed as AND function of the individual bit maps of each cell on the same carrier as follows:

$$B^F_{ijk} = B^C_{ijk1} \text{AND } B^C_{ijk2} \text{AND}, \ldots, \text{AND } B^C_{ijkS}$$

The creation of the carrier specific bit map of certain SI block, SIB1, is explained below with a specific example below:

Consider an example of bit maps (e.g., 8 bits j=8) for SIB1 (with 160 ms TTI and one occasion per 20 ms, e.g., i=2) in group of cells, cell1, cell2 and cell3 on carrier F1 (e.g., k=1) are denoted as $B^C_{2,8,1,1}$, $B^C_{2,8,1,2}$ and $B^C_{2,8,1,3}$ respectively. Examples of $B^C_{2,8,1,1}$, $B^C_{2,8,1,2}$ and $B^C_{2,8,1,3}$ are shown below:

$$B^C_{2,8,1,1} = \{1,0,0,0,1,1,0,1\}$$

$$B^C_{2,8,1,2} = \{1,0,0,1,0,1,0,1\}$$

$$B^C_{2,8,1,3} = \{1,0,0,1,0,0,0,1\}$$

The network node creates the carrier specific (common) bit map ($B^F_{2,8,1,1}$) for SIB1 on cells on F1 using AND operation as given below:

$$B^F_{2,8,1,1} = \{1,0,0,0,0,0,0,1\}$$

In one example embodiment, the carrier specific (common) SI scheduling information is created by a network node transmitting the information about the SI scheduling information to the UE (e.g., NN1 serving the UE). In a second example embodiment, the carrier specific (common) SI scheduling information is created by a network node different than the network node transmitting the SI scheduling information to the UE (e.g., a neighbor BS, a core network node, etc.). In both cases, the network-node receives or obtains the information about the individual SI scheduling information in each cell from the other network nodes. In the second example embodiment, the network node transmits information about the carrier specific (common) SI scheduling information for each carrier to each network node (e.g., to NN1 etc.). In a third example embodiment, the carrier specific (common) SI scheduling information may be created by a network node by receiving information from the JE. In such a scenario, the UE is configured to acquire the SI scheduling information for certain type of SI block (e.g., SIB1) of one or more cells on certain carrier frequency.

In another example embodiment, SI scheduling information depends on the type of service being provided and/or offered in the cell. For example, cells that provide services to sensor-type devices (e.g., Redcap UE, MTC) may have certain traffic behavior and those devices may have a certain characteristic in terms of power consumption, coverage levels, etc. In this example, it is assumed that actual SIB1 transmissions are at least H within the SIB1 TTI. The cell may further transmit at least H number of SIB1 with a certain transmission pattern within the TTI (e.g., in the beginning, end of TTI, or in every other transmission opportunities). The reason is that such devices are typically power limited or lower complexity (e.g., lower number of receive antennas) compared to reference (legacy) UEs. Having a fixed or a certain type of transmission pattern may reduce the number of blind decoding attempts. Another reason is that such devices could be located in the coverage extension region (i.e., lower received signal level compared to the reference (legacy) UEs). By having at least H number SIB1 transmissions (larger than the number configured with the reference UEs) within the SIB1 TTI with some transmission pattern, such UEs can successfully decode SIB1.

In yet another example embodiment, SI scheduling information depends on the type of deployment where the target cell belongs. If the target cell is served by, for example, a micro base station, pico base station, or a home Node B, then a certain SIB1 transmission pattern may be used. Example of such transmission patterns include minimum number of actual SIB1 transmission within its TTI, where they are transmitted, how often they are transmitted, etc. The reason is that such small base stations are typically used for load sharing, or indoor environments where the coverage is generally not a problem. In such scenarios, the UE may be able to successfully decode the SIB1 using, for example, single attempt compared to a scenario with a macro base station serving a large cell where the UE may need to do soft-combining in order to successfully decode the same SIB1.

In yet another example embodiment, the SI scheduling information can be such that SI transmissions are rapidly increased within its TTI based on triggering of certain trigger. In particular, upon triggering of public safety (PS) events or public warning events (PWS) such as when SIB6,7,8 are transmitted, the SIs are transmitted much more dense (e.g., in every transmission opportunity) compared to when such events were not triggered.

Step 2: Signals the SI Scheduling Information to the UE

In this step, the cell1 signals or transmits or provides information about the SI scheduling information of own cell and/or neighboring cells. This is explained below with several examples.

In one example embodiment, the cell1 transmits the information about SI scheduling information for certain type(s) of SI block (e.g., SIB1, SIB2, etc.) of a group of cells on a carrier frequency for one or more carrier frequencies (e.g., a common SI scheduling information for one or more carrier frequencies such as for F1, F2, F3, etc.).

In another example embodiment, each cell (e.g., cell1) may further transmit information about SI scheduling information for certain type of SI block of its-own cell (e.g., bit map for SIB1 in cell1).

In still another example embodiment, a cell (e.g., cell1) may further transmit SI scheduling information for certain type(s) of SI block of a specific cell (e.g., bit map for SIB1 in cell2), for example when requesting that the UE perform a certain procedure such as CGI acquisition of cell2.

In yet another example embodiment, a cell (e.g., cell1) may transmit information about SI scheduling information in a compact manner to reduce the signaling overheads. In one scenario, the transmitted information may comprise an indicator indicating whether the SI scheduling information for certain type(s) of SI block (e.g., SIB1) on one or more neighbor cells is the same as transmitted in a reference cell, or not. Examples of reference cells include serving cell (e.g., cell1), special cell (SpCell), certain SCell, certain cell involved or used by the UE in particular operation or measurements (e.g., RSTD). In another exemplary scenario, the transmitted information may comprise an indicator indicating whether the SI scheduling information for certain type(s) of SI block (e.g., SIB1) is the same on one or more carrier frequencies is the same as transmitted in a reference frequency, or not. Examples of reference carriers include a carrier of the serving cell (e.g., cell1), a carrier of the special cell (SpCell), a carrier of certain SCell, a certain carrier involved or used by the UE in a particular operation or measurements (e.g., SFTD).

The information about SI scheduling information in the above examples can be signaled to the UE in SI (e.g., in one or more of MIB, SIB1, etc.) or in a UE-specific message (e.g., over UE-specific PDCCH, PDSCH, etc.). The transmission of the information about the SI scheduling information (e.g., cell-specific bit map of SIB1 used in the same cell (e.g., SIB1 in cell1)) in MIB may particularly be useful for low complexity UE such as Redcap UE and/or MTC, etc. The information may advantageously enable the UE to reduce the power consumption and/or reduce the SI acquisition delay when acquiring the SI of the cell e.g. SIB1.

Some Examples of signaling bit map for SIB31 are now discussed. One example of signaling is to use a bitmap consisting of the SIB1 transmission occasions within the SIB1 transmission periodicity of 160 ms. According to 3GPP TS38.331 v15.8.0, the default SIB1 transmission periodicity is 20 ms for the SSB and CORESET multiplexing pattern 1, which means there are 8 transmission occasions within 0.160 ms. In this case, the bitmap is the length of 8, and the first bit indicates the SIB1 transmission in the first SIB1 transmission occasion within the SIB1 transmission periodicity. For example, value 0 in the bitmap indicates that SIB1 message is not transmitted and value 1 in the bitmap indicates that SIB1 message is transmitted. If the cell transmits SIB1 message in all the transmission occasions, then the bitmap is set as "1111 1111". On the other hand, if the cell schedules SIB1 message only in the first transmission occasion, then the bitmap is given as "1000 0000".

Figure 4:
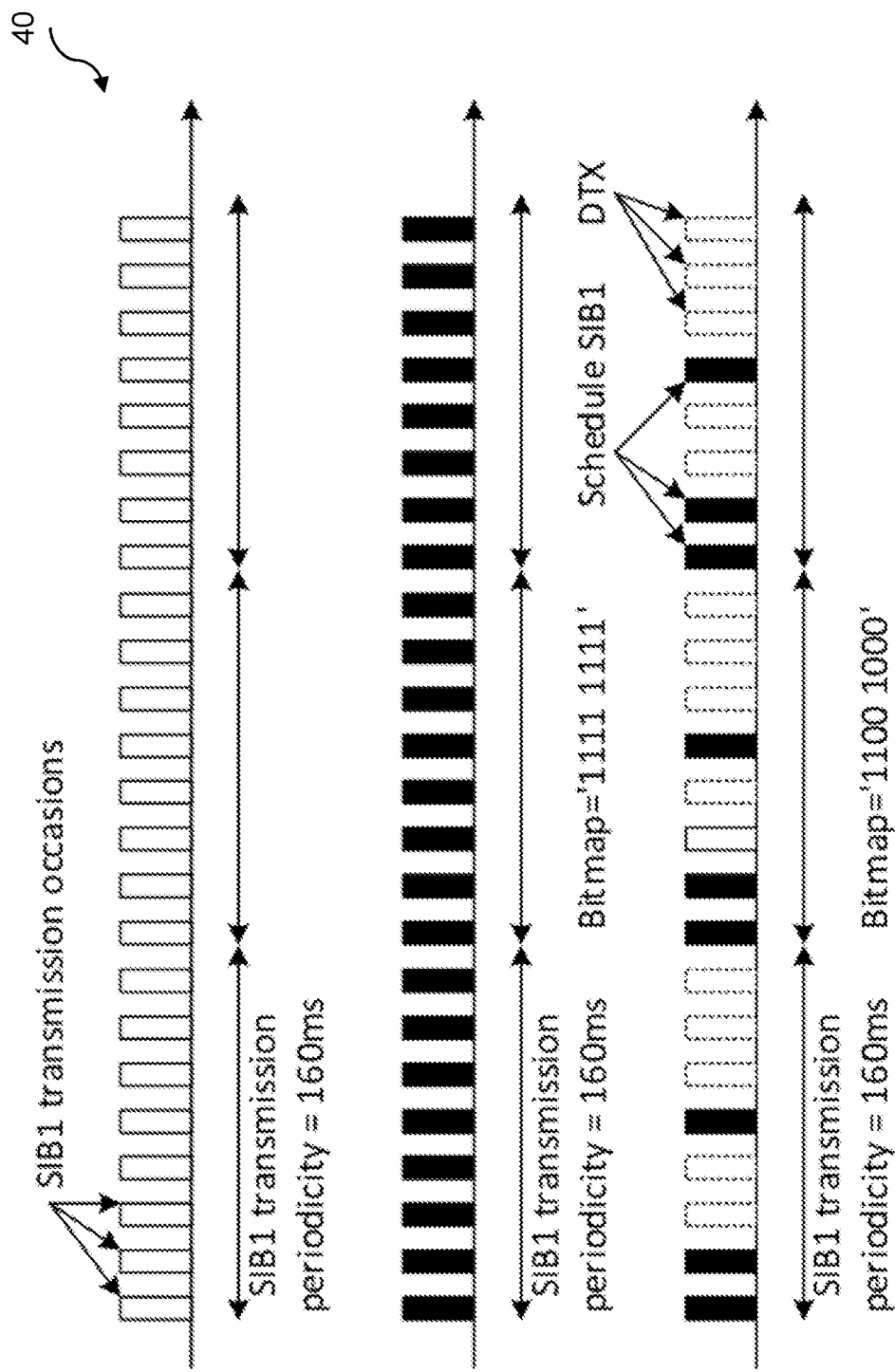
FIG. 4 illustrates another example of SIB1 scheduling and the corresponding bitmap, according to certain embodiments.

FIG. 4 illustrates another example 40 of SIB1 scheduling and the corresponding bitmap, in accordance with certain embodiments. In the example of FIG. 4, SIB1 can be scheduled by default every 20 ms within the SIB1 transmission periodicity of 160 ms (illustrated at the top of FIG. 4). The middle of FIG. 4 illustrates the case when the network schedules SIB1 every SIB1 transmission occasion, therefore the bitmap is set to "1111 1111". The bottom of FIG. 4 illustrates the case when the network schedules the SIB1 in the $1^{st}/2^{nd}$ and $5^{th}$ occasions, and therefore the bitmap becomes "1100 1000".

Another example is the case of SIB1 scheduling indication with the SSB and CORESET multiplexing pattern 2/3. According to 3GPP TS38.331 v15.8.0, SIB1 transmission repetition period is the same as the SSB period. Since the minimum SSB period is 5 ms, there are 32 SIB1 transmission occasions within 160 ms. Since the UE does not know the SSB period of another cell before neighboring cell search, in certain embodiments the cell1 transmits the bitmap with the length of 32. The first bit indicates the first SIB1 transmission occasion within 160 ms. Value 0 in the bitmap indicates that SIB1 message is not transmitted and value 1 in the bitmap indicates that SIB1 message is transmitted. If the SSB period of cell2 is 5 ms and cell2 transmits SIB1 messages with all the occasions, the bitmap becomes "1111 1111 1111 1111 1111 1111 1111 1111". On the other hand, if the SSB period is 160 ms, there is only one SIB1 transmission occasion within 160 ms. In this case, the bitmap becomes "1000 0000 0000 0000 0000 0000 0000 0000". In certain embodiments, the UE only checks the first bit and ignores the rest of bits, since these do not correspond to any valid transmission occasion within the SSB period.

In yet another example; when cell1 indicates the SIBx message scheduling of its own cell, the cell1 signals the bitmap whose length is the same as the SIBx transmission occasions within the SI window. For example, if cell1 configures 10 SIBx transmissions within the SI windows length of 20 slots, then the cell1 signals the bitmap of 10 bits. With this bitmap, value 0 in the bitmap indicates that SIBx message is not transmitted and value 1 in the bitmap indicates that SIBx message is transmitted. If the cell1 transmits SIBx with all the occasions, the bitmap becomes, "1111 1111 11". On the other hand, if the cell1 schedules SIBx only with the first 2 occasions, then the bitmap becomes "1100 0000 00".

Figure 5:
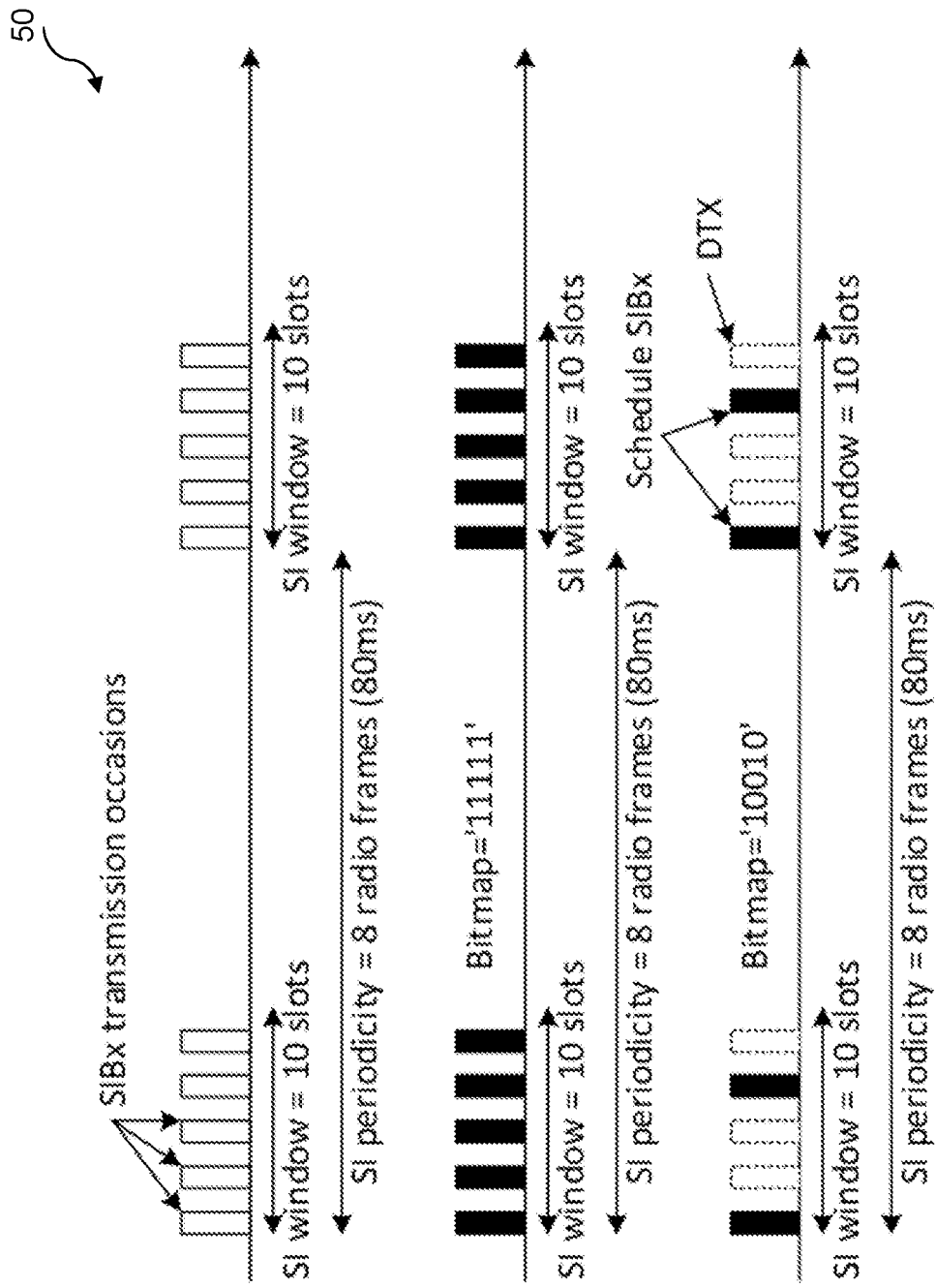
FIG. 5 illustrates another example of SIBx scheduling and the corresponding bitmap, according to certain embodiments.

FIG. 5 illustrates another example 50 of SIBx scheduling and the corresponding bitmap. In this example, SIBx can be scheduled 5 times within the SI window of 10 slots (illustrated in the top of FIG. 5) with the SI periodicity of 8 radio frames (=80 ms). The middle of FIG. 5 illustrates the case when the network schedules SIBx every SIBx transmission occasion, therefore the bitmap is set to "11111". The bottom of FIG. 5 illustrates the case when the network schedules the SIBx message in the $1^{st}$ and $4^{th}$ occasions, and therefore the bitmap becomes "10010".

In another example embodiment, bitmaps containing a large number of adjacent "1" or "0" may be more efficiently indicated by indicating the count of adjacent "1" or adjacent "0". For example, if the bitmap is "11111111110000000000000000000000" this may be described as 10 "1" bits followed by 22 "0" bits. If there is an agreement that the SI is always scheduled on the earliest opportunities in the SI transmission period, then it is sufficient to indicate the number of opportunities actually used, for example 10 in the present example. Alternatively or additionally, in certain embodiments the number of unused opportunities could be indicated, and/or any other information or convention which allows the UE to determine the pattern of scheduled SI message transmissions can be used. Any specified rule or signaled information or combination of specified rule and signaled information which allows the construction or reconstruction of the bitmap is considered equivalent to explicit signaling of the bitmap itself.

In certain embodiments, SIB1 scheduling information may also contain information about the validity of the signaled bit map (i.e., for how long the signaled bit-map is valid). It may only be valid for certain hours, or certain time of the day, etc., after which the UE falls back to the default decoding procedure which may involve blind decoding attempts in every SIB1 occasions (and thus consumes more UE power).

Step 3: Requests UE to Acquire SI

In this step, the cell1 requests the SI acquisition of own cell (cell1) or neighboring cell (cell2). In certain embodiments, the SI acquisition request may be included in one or more of the following network procedures, or another suitable network procedure:

- CGI information report of cell2;
- RRC connection release with redirection to a carrier operating cell2;
- ANR purpose;
- Other SI messages acquisition of cell1 and cell2;
- Cell change (e.g., for handover);
- Positioning measurement such RSTD measurements, which may require the UE to acquire SFN of at least one cell used for RSTD measurement (the SFN is transmitted in MIB);
- SFTD measurements (e.g., which may require the UE to acquire SFN of one or both cells used for SFTD measurement); and
- Reception of PWS information such as ETWS information or CMAS information from SI.

In yet another example embodiment, cell1 may further request the UE to acquire the information about the cell specific SI scheduling information of certain type(s) of the SI block (e.g., SIB1) transmitted by cell2 (e.g., cell 1 requests the UE to acquire information about SIB1 scheduling used cell2 such as bit map of SIB1 used in cell2).

In certain embodiments, after sending the SI acquisition request to the UE, the cell may set a timer corresponding to the time the UE is expected to complete the command. The set value in the timer may include the delay corresponding to SIBx acquisition delay, $T_{S1}$. To illustrate, assume N is the number of SI transmission occasions within the SI transmission period in which the target cell2 transmits the SI (e.g., number of occasions in which SIB1 is scheduled by cell2). The parameter N assumes a bit map comprising [1101 0000] corresponds to 8 SIB1 transmission occasions within SIB1 period of 160 ms. Here, bit 1 denotes SIB is transmitted in the SIB1 occasion and 0 means SIB1 is not transmitted in SIB1 occasion. Therefore, in this example N=3. In certain embodiments, a threshold (Nt) can be defined, where Nt is a minimum number of SI transmissions (e.g., PDSCH transmissions) within the SI transmission period (e.g., SIB1 TTI) required by the UE to achieve sufficient probability of successful decoding the SI using soft combining. If there is at least Nt number of SI transmissions within the SI period, then the UE is able to acquire the SI within a shorter time period compared to the case when number (N) of SI transmissions within the SI transmission period is less than Nt. For example, if the number (N) of bits in the bitmap is less than Nt, (e.g., N=1 and Nt=2), then the cell1 assumes $T_{S1}$=T1. If the number (N) of bits in the bitmap is more than or equal to Nt, then the cell1 assumes $T_{S1}$=T2, where T1>T2. In certain embodiments, the value of $T_{S1}$ as a function of Nt can be pre-defined in the standard as a UE requirement. According to another example of the rule, if the UE is not configured with the information about the SI transmission scheduling (i.e., no bitmap is signaled) then the UE is allowed to acquire the SI of cell2 within T1; but if the UE is configured with the information about the SI transmission scheduling (i.e., bitmap is signaled) and N≥Nt then the UE is allowed to acquire the SI of cell2 within T2. In certain, embodiments, the rule can be pre-defined or configured by the network node. In certain embodiments, the value of Nt may further depend on one or more factors or conditions such as type of SI (e.g., MIB, SIB1, SIB2, etc.), radio conditions and/or signal quality (e.g., Signal to Interference plus Noise Ratio (SINR), Signal-to-Noise Ratio (SNR) of a cell (e.g., cell2) whose SI is acquired, UE receiver type (e.g., single receiver, dual receivers, etc.), transmit antenna configuration, or any other suitable factor and/or condition. For example, in certain embodiments the parameter Nt may depend on a relation between the signal quality (Q) of the target cell whose SI is acquired and signal quality threshold (Qt). When the signal quality, such as SINR, is less than a SINR threshold (SINRt) (e.g., SINRt=−3 dB), then the value of Nt is larger compared to the case when SINR is equal to or above SINRt.

In certain embodiments, cell1 may set the different threshold N per SI message type, for example, $N_{SIB}1$=2 and $N_{SIB2}$=3, etc. Alternatively, 3GPP specifications may specify that the UE is required to achieve a certain probability of reception of the SIB when at least $N_{SIB}$ transmissions are available. In this case, $N_{SIB}$ may be a function of one or more of message payload size, modulation and coding scheme, transmission bandwidth, coding rate, or any other parameter related to the transmission of the SIB.

An advantage of using the bitmap and/or combining with the information on the number of SI transmissions the UE needs to successfully decode with certain probability of reception is that the serving cell gets an estimate of the expected interruptions in the serving cell due to autonomous gaps that are used for receiving the SI message (CGI) in the target cell. For example, if extracted information from the above indicates that the UE needs at least 2 transmissions and bit maps indicate that SIBs are present in at least two occasions within the TTI, then the cell can assume that there is a maximum of 2 autonomous gaps within the TTI. However, if the extracted information shows that the UE needs 2 SI message transmissions, but the bit map shows that there is only 1 SI message transmission within the TTI, then the serving cell can except the UE to create more autonomous gaps.

Another advantage of using the bitmap is that the UE can align the autonomous gaps to where the SIs are actually transmitted. This advantageously improves the resources utilization.

Step 4 (Optional): Receive the Report from UE

In this step, the cell1 optionally receives the report from UE. One example of the report is the CGI information of cell2 or some SIB1 information from cell2 for ANR purpose.

Method in UE of Acquiring SIBs

Step 1: Read SI Message Scheduling Bitmap

In this step, the UE receives the SI message scheduling bitmap from the cell1. One example of the bitmap is the SIB1 scheduling bitmap of cell2. Another example is the SIB2 scheduling bitmap of cell1 and/or cell2.

Step 2: Obtain Configuration for SI Message Acquisition Command

According to one example embodiment, in this step the UE receives the SI message acquisition request from the cell1. For instance, the SI acquisition request may be included in the following network procedures:

- CGI information report of cell2;
- ANR purpose;
- Other SI messages acquisition of cell1 and cell2;
- Cell change (e.g., for handover);
- Positioning measurement such RSTD measurements (e.g., which may require the UE to acquire SFN of at least one cell used for RSTD measurement. The system frame number (SFN) is transmitted in MIB;
- SFTD measurements (e.g., which may require the UE to acquire SFN of one or both cells used for SFTD measurement);
- RRC connection release with redirection to a carrier operating cell2; and Reception of a paging message indicating the need to receive PWS information.

According to another example embodiment, the UE may autonomously decide to acquire the SI of cell2 upon triggering a certain procedure (e.g., internal or pre-configured procedures). Examples of such procedures include: cell re-selection to cell2; and RRC connection re-establishment to cell2.

Step 3: Receive SI Message

In this step, the UE attempts to acquire the necessary SI messages. In certain embodiments, if the UE has the bitmap of the corresponding SI message in advance, the UE decodes PDCCH for SI message transmission according to the scheduling-information (e.g., bitmap) signaled by the network.

In certain embodiments, if the UE finds PDSCH scheduling in PDCCH, the UE receives the PDSCH and tries to decode it. If the UE can decode PDSCH, this means the UE can also acquire the necessary SI message and the UE moves to the next procedure.

If the UE cannot decode the PDSCH, if there are other SI message transmission occasions within the SIB1 transmission periodicity (for SIB1) or SI window (for SIBx), according to the bitmap, then the UE keeps the received PDSCH symbols in the buffer. For example, the bitmap for SIB1 may be set to "11100000" and it is the first SIB1 transmission occasion, there are two more transmission occasions. In the next SI message transmission occasion, the UE attempts to soft combine the received PDSCH symbols to the stored PDSCH symbol buffer and tries to decode it. If the UE can decode PDSCH, this means the UE can also acquire the necessary SI message and the UE moves to the next procedure. If the UE cannot decode yet, but there are more SI message transmission occasions in the given bitmap, the UE keeps the PDSCH symbol buffer and continues to attempt to soft combine PDSCH symbols during the SIB1 transmission periodicity for SIB1 or SI window for SIBx.

In certain embodiments, if the UE cannot decode PDSCH within one SIB1 transmission periodicity for SIB1 or SI window for SIBx, then the UE may determine whether to clear the PDSCH symbol buffers or not according to the bitmap. In one example embodiment, the UE keeps the PDSCH symbols buffer so that it can attempt to soft combine the PDSCH symbols in the next SIB1 transmission periodicity for SIB1 or SI window for SIBx, for instance if the bitmap contains M ones or less (e.g., M=1). If the number of 1's in the bitmap is more than M (e.g., M=1), then the UE clears the PDSCH symbol buffer. According to another example embodiment, the UE clears the PDSCH symbols buffer regardless of the number of 1's in the bitmap for every SIB1 transmission periodicity for SIB1 or SI window for SIBx. In certain embodiments, the value of M may be specified by the 3GPP specifications and it may be specified that the UE is allowed to soft combine if the bitmap contains M ones or less, or equivalently if there are fewer than M opportunities to decode PDSCH within the SIB transmission periodicity. The value of M may be fixed in 3GPP specifications, or it may be a function of one or more of SIB payload, MCS, transmission bandwidth, coding rate, and/or any other parameters related to the transmission of the SIB. In certain embodiments, the value of M may further depend on the channel conditions. Examples of channel condition indicators include SNR, SINR, and Es/Iot levels.

Figure 6:
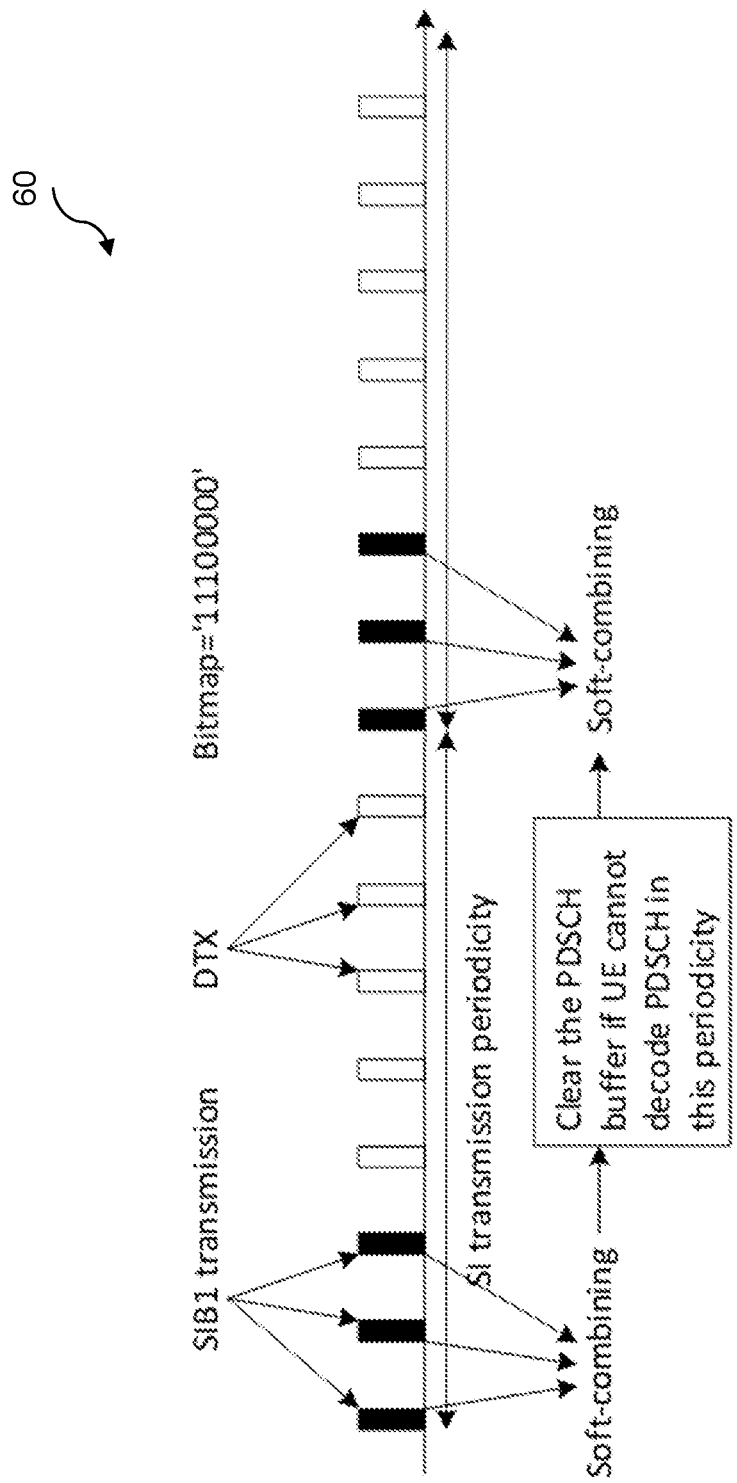
FIG. 6 illustrates an example of the soft-combining SI receiver when the cell1 signals the bitmap with "11100000", according to certain embodiments.

FIG. 6 illustrates an example 60 of the soft-combining SI receiver when the cell1 signals the bitmap with "11100000". In the example of FIG. 6, the SI receiver attempts to soft combine the PDSCH symbols only within the SI transmission periodicity. Thus, the PDSCH buffer is cleared every SI transmission periodicity in the example of FIG. 6. If the UE cannot decode PDSCH within a SI transmission periodicity, the UE clears the PDSCH buffer and starts to receive PDSCH symbols in the next SI transmission periodicity.

Figure 7:
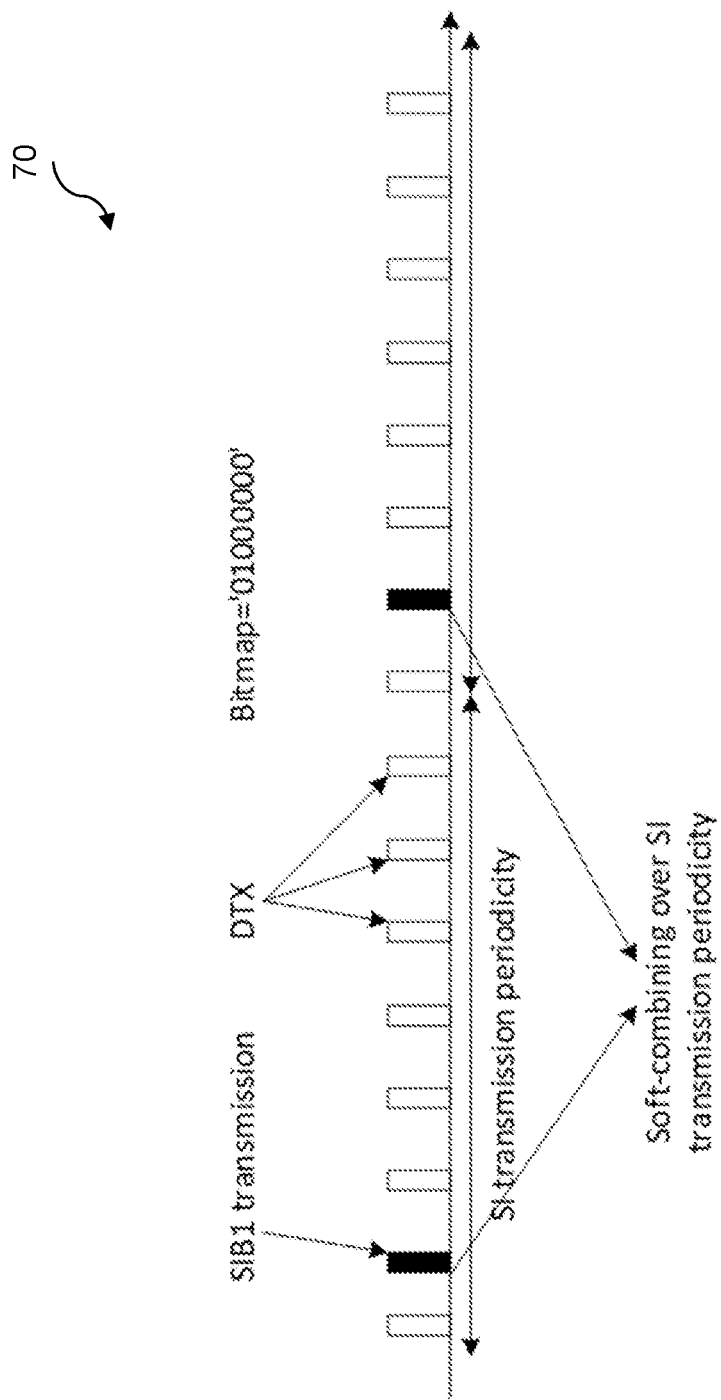
FIG. 7 illustrates another example of the soft-combining SI receiver when the cell1 signals the bitmap with "01000000", according to certain embodiments.

FIG. 7 illustrates another example 70 of the soft-combining SI receiver when the cell1 signals the bitmap with "01000000". In the example of FIG. 7, the SI receiver attempts to soft combine the PDSCH symbols over the SI transmission periodicity.

In certain embodiments, if the UE has not received the SI messages scheduling bitmap, the UE tries to decode PDCCH every possible SI message transmission occasions. For example, if cell1 requests to acquire SIB1 message from cell2 and cell2 configures the SSB and CORESET multiplexing pattern 1, then the UE tries to decode PDCCH every 20 ms (i.e., 8 times per SIB1 transmission periodicity of 160 ms). This is consistent with the legacy (e.g., 3GPP Release 15 NR) behavior where there is no possibility to signal information about SI scheduling.

Step 4: (Optional): Report to the Network.

In certain embodiments, in this step the UE optionally reports the acquired SI message to the cell1. Examples of the report include the CGI information of cell2 or some SIB1 information from cell2 for-ANR purpose.

According to one example embodiment, the UE may further acquire the information about the cell-specific SI scheduling information transmitted by cell2 (e.g., information about SIB1 scheduling used in cell2, such as the bit map of SIB1 used in cell2). In one example embodiment, the UE may acquire this when acquiring the SI of cell2 (e.g., information sent by cell2 in SIBx). In another example embodiment, the UE may acquire this by attempting to decode all possible occasions where the SI can be transmitted within the TTI of that SI (e.g., in all 8 occasions within 160 ms TTI of SIB1 in cell2). This will enable the UE to create, for example, a bit map (e.g., 0 and 1 denoting occasions when SIB1 is not transmitted and 1 denoting when SIB1 is transmitted or vice versa).

In certain embodiments, the UE uses the information about the acquired information about SI scheduling used in cell2 for one or more tasks. Examples of such tasks may include transmitting the acquired information to cell1, using the acquired information for creating a common/carrier specific SI scheduling on a group of cells on the same carrier, transmitting the information about the common SI scheduling created by the UE to cell1, or any other suitable task.

In certain embodiments, the network node receiving the information about the SI scheduling used in cell2 from the UE may use the information for doing one or more tasks (e.g., for creating a common SI scheduling information on a carrier, for network planning and optimization, or any other suitable task.

Figure 8:
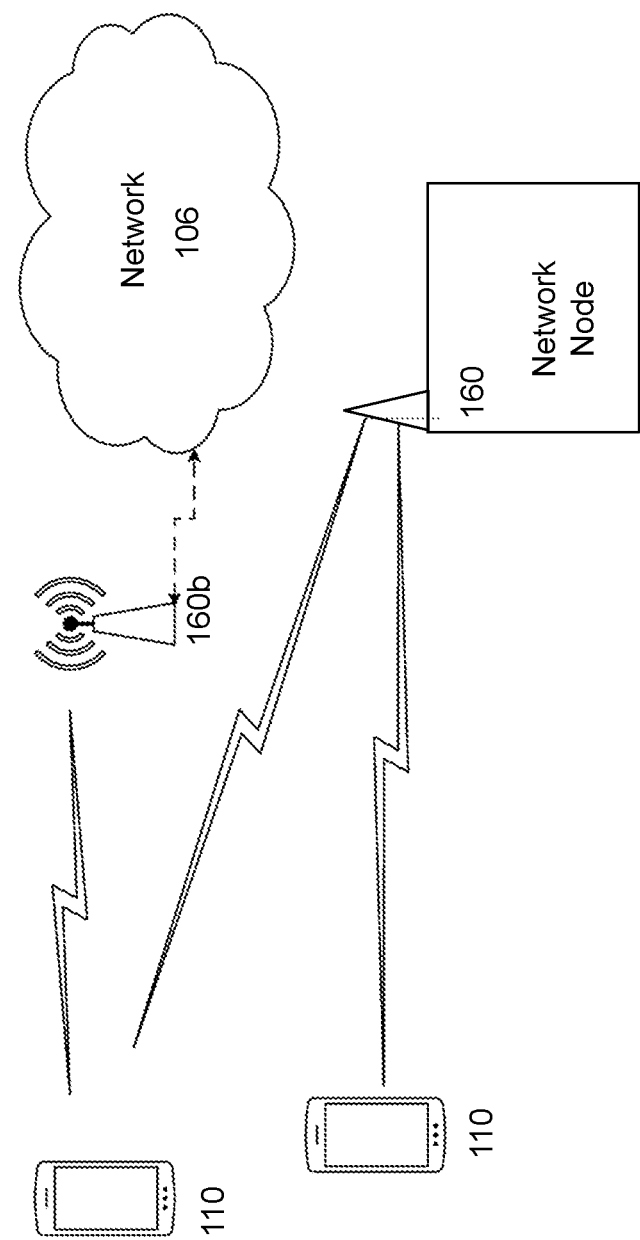
FIG. 8 illustrates an example wireless network, according to certain embodiments.

FIG. 8 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
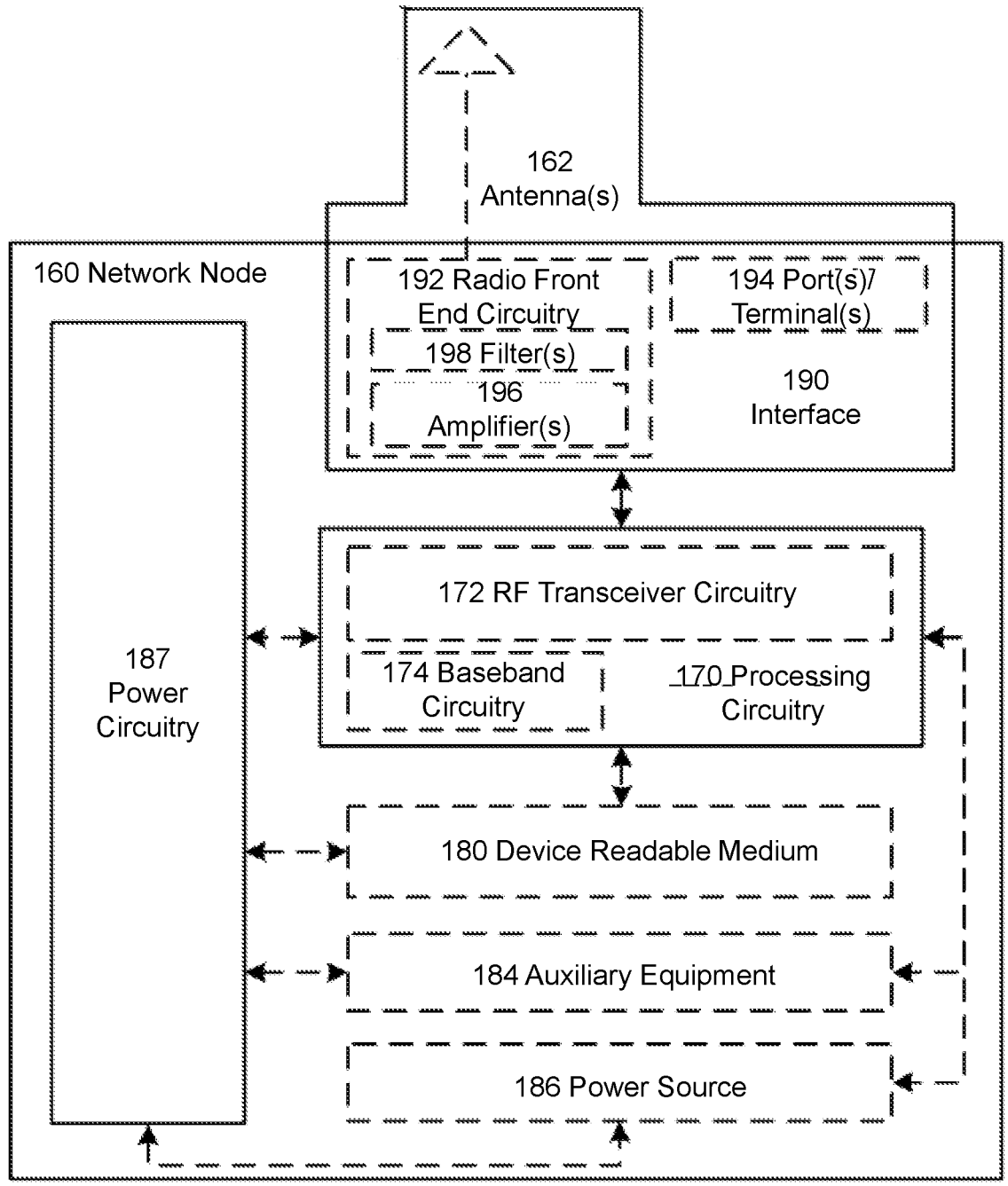
FIG. 9 illustrates an example network node, according to certain embodiments.

FIG. 9 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in 1FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 10:
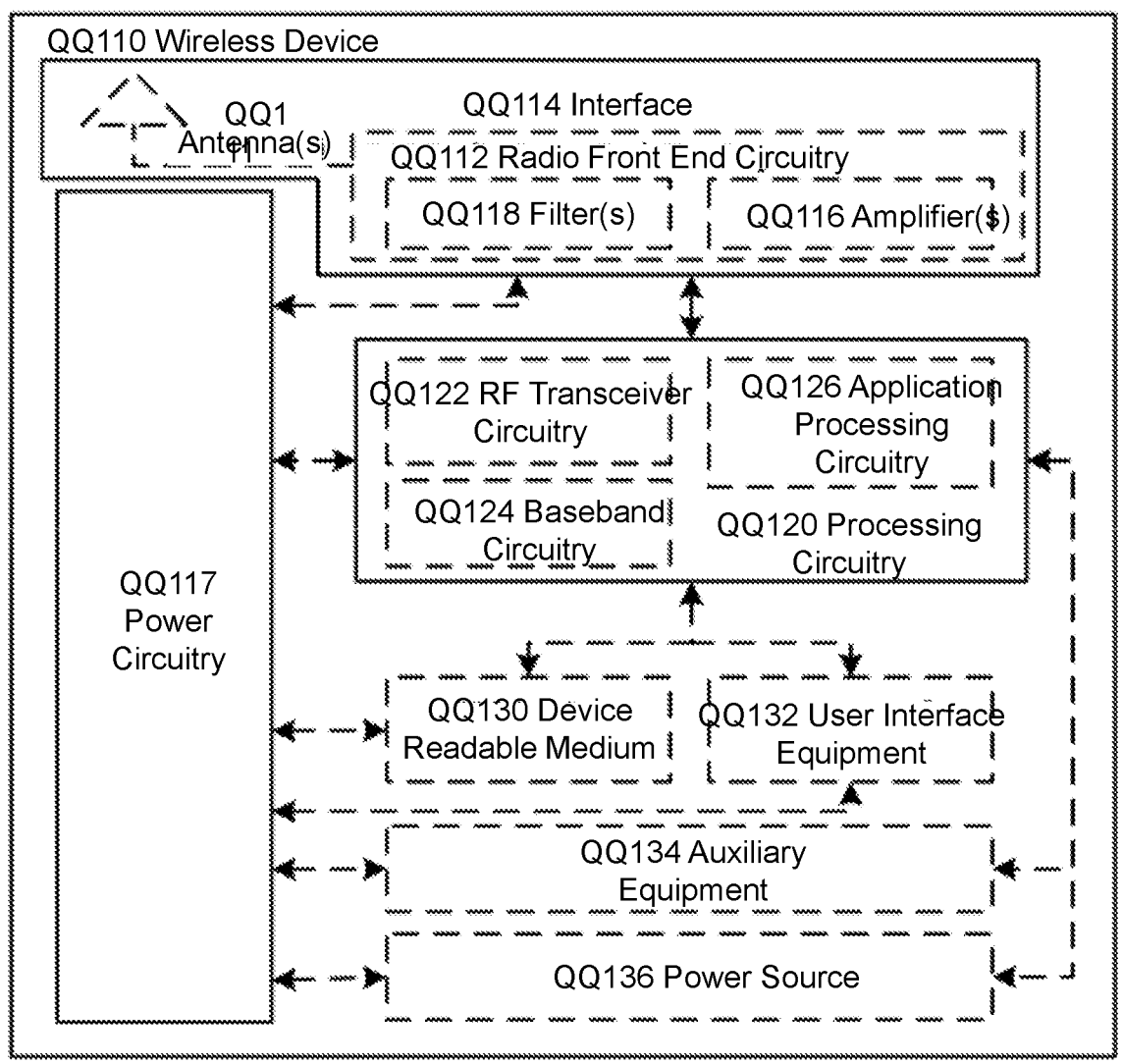
FIG. 10 illustrates an example wireless device, according to certain embodiments.

FIG. 10 illustrates an example wireless device 110, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 11:
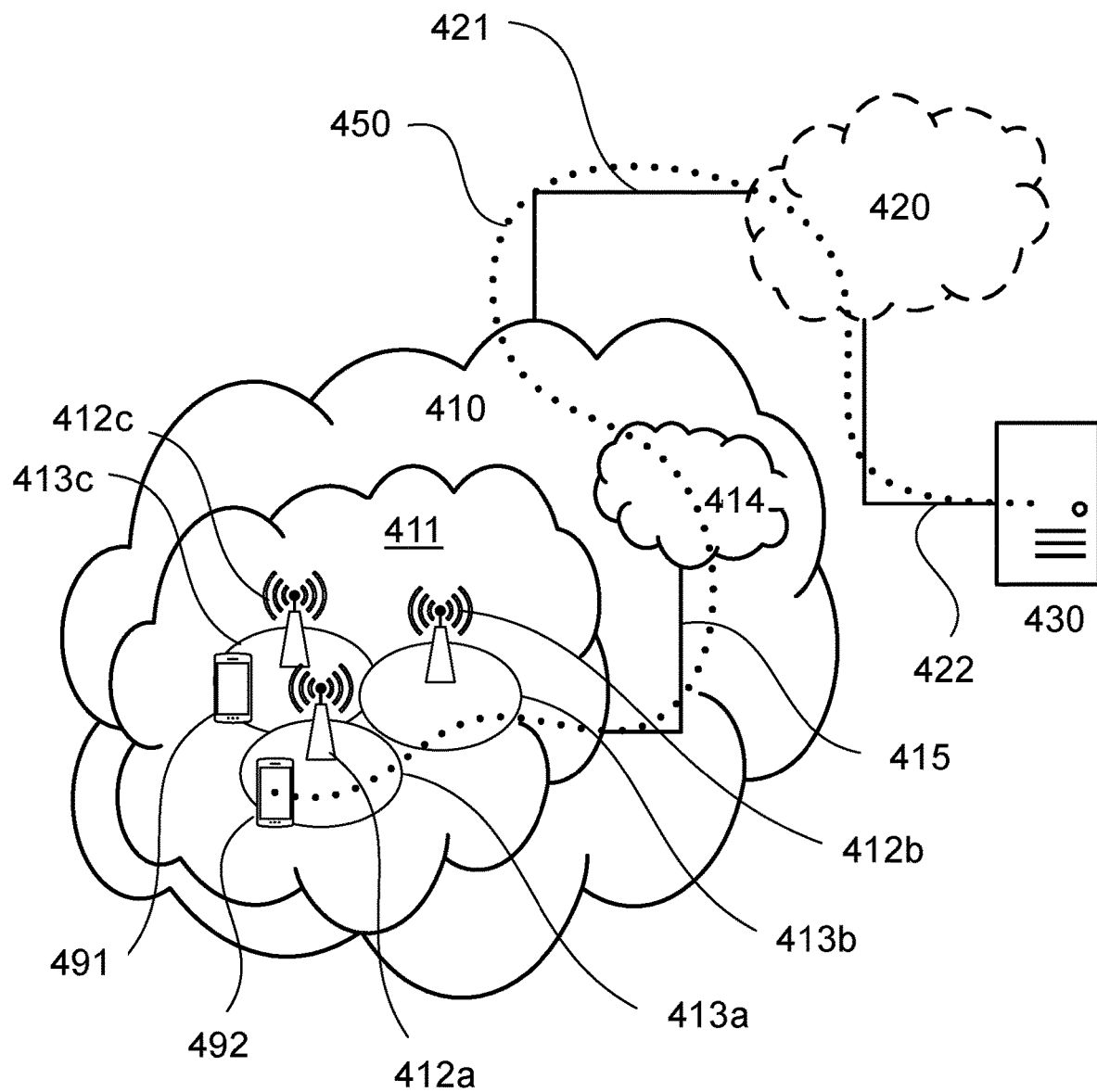
FIG. 11 illustrates a telecommunication network connected via an intermediate network to a host computer, according to certain embodiments.

FIG. 11 illustrates an example telecommunication network connected via an intermediate network to a host computer in accordance with some embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 12:
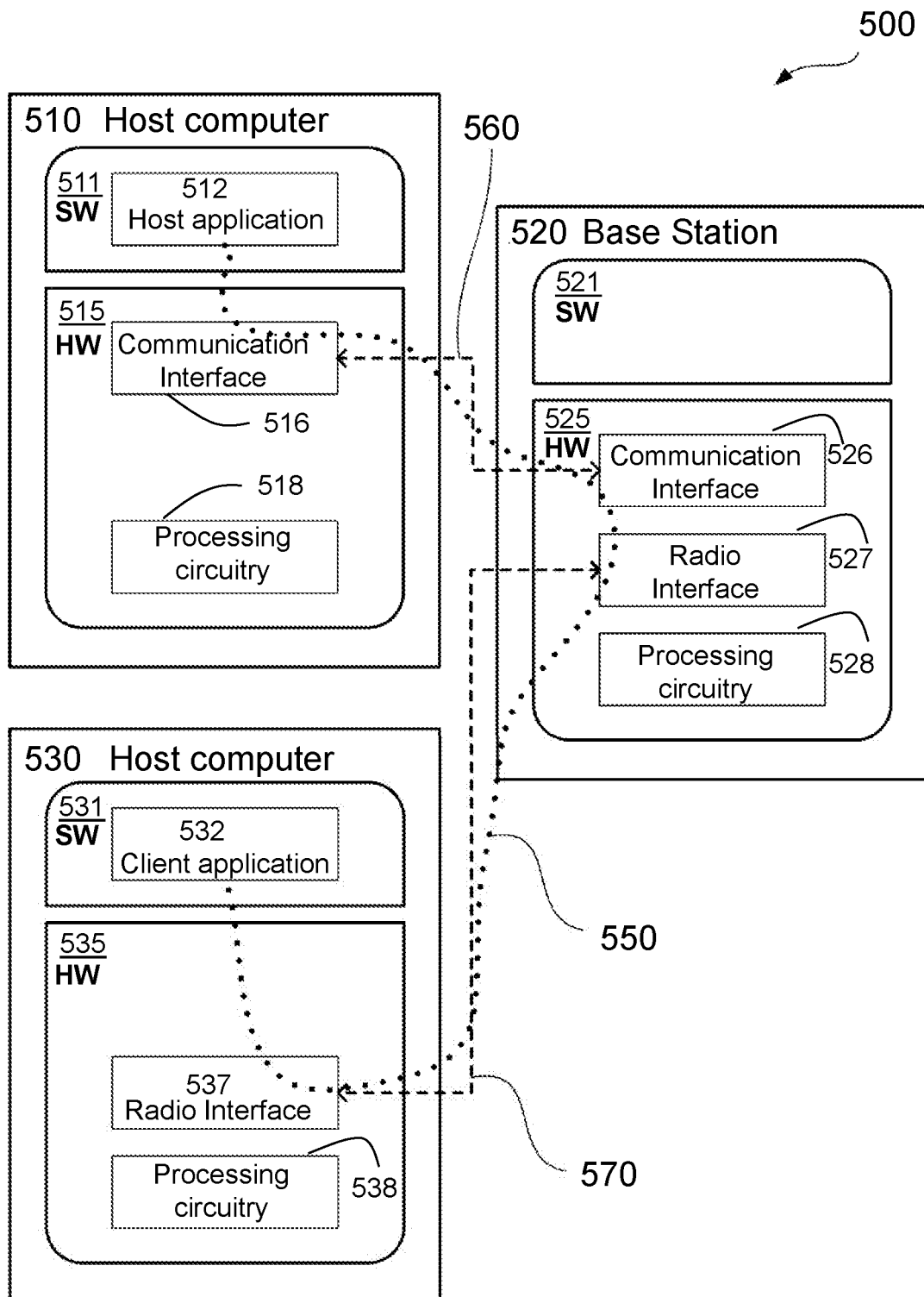
FIG. 12 illustrates a generalized block diagram of a host computer communicating via a base station with a user equipment over a partially wireless connection, according to certain embodiments.

FIG. 12 illustrates an example host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 13, 14:
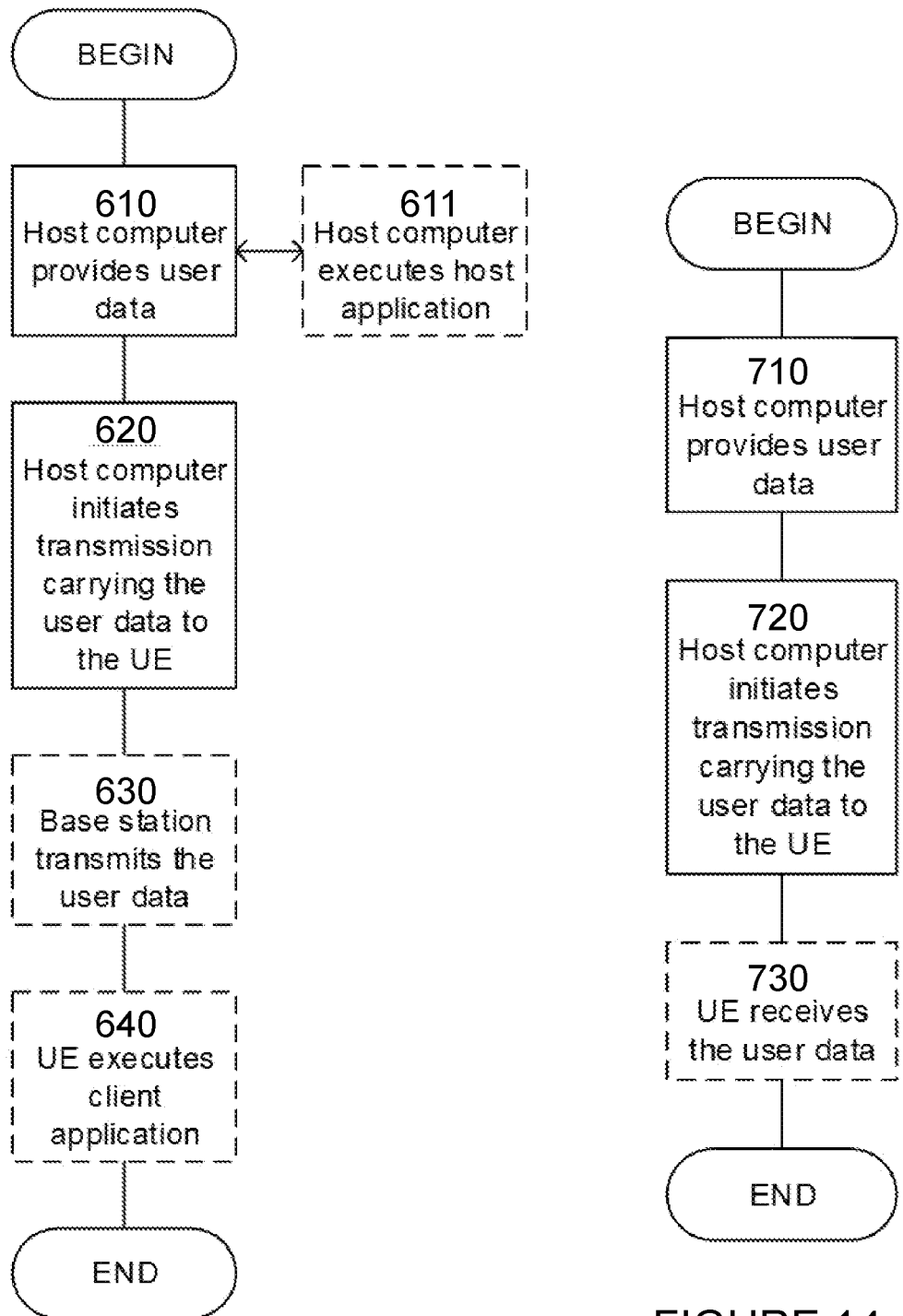
FIG. 13 illustrates a method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 15:
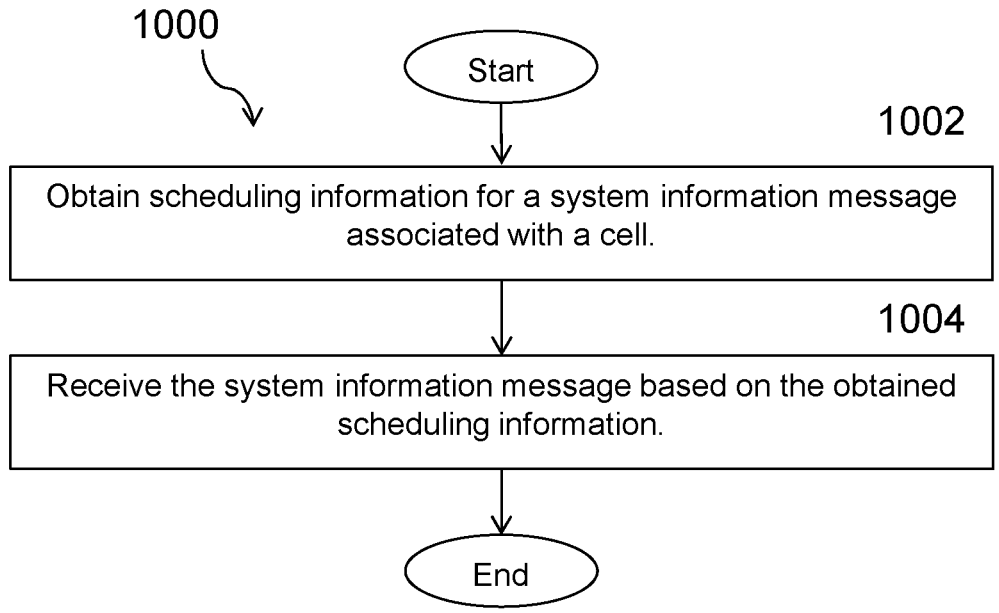
FIG. 15 illustrates an example method by a wireless device, according to certain embodiments.

FIG. 15 is a flow chart of a method 1000 in a wireless device 110 (e.g., a UE 200), in accordance with certain embodiments. More particularly, FIG. 15 is a flow chart of a method 1000 performed by a wireless device 110 for acquiring system information. The method 1000 begins at step 1002, where the wireless device obtains scheduling information for a system information message associated with a cell.

In certain embodiments, the system information message may comprise one of: a MIB; and a SIB. In certain embodiments, the system information message may be SIB1.

In certain embodiments, obtaining the scheduling information may comprise receiving the scheduling information from a first cell. The scheduling information may be associated with a system information message of the first cell. The scheduling information may be associated with a system information message of a second cell.

In certain embodiments, the scheduling information for the system information message may comprise a system information message scheduling bitmap. In certain embodiments, the system information message scheduling bitmap may comprise a number of bits equal to a number of system information message transmission occasions within a system information window. A bit value of each bit may indicate whether the system information message is transmitted in a corresponding system information message transmission occasion. In certain embodiments, a bit value of 1 may indicate that the system information message is transmitted in a corresponding system information message transmission occasion. A bit value of 0 may indicate that the system information message is not transmitted in a corresponding system information message transmission occasion. In certain embodiments, a bit value of 0 may indicate that the system information message is transmitted in a corresponding system information message transmission occasion. A bit value of 1 may indicate that the system information message is not transmitted in a corresponding system information message transmission occasion.

In certain embodiments, the obtained scheduling information may comprise a common system information message scheduling bitmap for a group of cells operating on a given carrier frequency.

In certain embodiments, the method may comprise determining to acquire the system information message.

In certain embodiments, the step of determining to acquire the system information message may be performed in response to receiving a system information message acquisition request.

In certain embodiments, the wireless device may autonomously determine to acquire the system information message in response to a trigger. The trigger may comprise one of: a cell re-selection procedure; and radio resource control connection re-establishment.

At step 1004, the wireless device receives the system information message based on the obtained scheduling information.

In certain embodiments, receiving the system information message based on the obtained scheduling information may comprise decoding a PDCCH for the system information message according to the scheduling information. In certain embodiments, the method may further comprise: determining that PDSCH scheduling information is included in the PDCCH; receiving the PDSCH; and attempting to decode the PDSCH at a first system information message transmission occasion. In certain embodiments, the method may further comprise in response to decoding the PDSCH at the first system information message transmission occasion, acquiring the system information message. In certain embodiments, the method may further comprise in response to not decoding the PDSCH at the first system information message transmission occasion, determining whether there are other system information message transmission occasions within a transmission periodicity of the system information message. In certain embodiments, the method may further comprise: in response to determining that there are other system information message transmission occasions within the transmission periodicity of the system information message, storing one or more received PDSCH symbols in a buffer; receiving PDSCH in a subsequent system information message transmission occasion within the transmission periodicity of the system information message; soft combining the stored one or more received PDSCH symbols with one or more PDSCH symbols received in the subsequent system information message transmission occasion; and attempting to decode the PDSCH using the soft-combined PDSCH symbols.

In certain embodiments, the method may further comprise in response to determining that the PDSCH cannot be decoded using the soft-combined PDSCH symbols, storing the one or more received PDSCH symbols and the one or more PDSCH symbols received in the subsequent system information message transmission occasion in the buffer. In certain embodiments, the method may further comprise: determining that there are no other system information message transmission occasions within the transmission periodicity of the system information message; and determining whether or not to clear the buffer. In certain embodiments, the determination of whether or not to clear the buffer may be based on the obtained scheduling information.

In certain embodiments, the method may further comprise: determining, based on the obtained scheduling information, that a number of system information message transmission occasions within the transmission periodicity of the system information message is below a threshold; and in response to determining that the number of system information message transmission occasions within the transmission periodicity of the system information is below the threshold, determining not to clear the buffer.

In certain embodiments, the method may further comprise: determining, based on the obtained scheduling information, that a number of system information message transmission occasions within the transmission periodicity of the system information message is above a threshold; and in response to determining that the number of system information message transmission occasions within the transmission periodicity of the system information is above the threshold, determining to clear the buffer. In certain embodiments, the threshold may be fixed. In certain embodiments, the threshold may be a function of one or more of: a system information message payload; a modulation and coding scheme; a transmission bandwidth; and a coding rate.

In certain embodiments, the method may comprise reporting the received system information message.

In certain embodiments, the method may further comprise: acquiring cell-specific system information scheduling information for a cell that is not serving the wireless device; and using the acquired cell specific system information scheduling information for one or more tasks. In certain embodiments, acquiring the cell-specific system information scheduling information for the cell that is not serving the wireless device may comprise: attempting to decode all possible occasions where a system information message of the non-serving cell can be transmitted; and creating a bit map indicating occasions when the system information message is transmitted.

In certain embodiments, the method may further comprise: providing user data; and forwarding the user data to a host computer via a transmission to a network node.

Figure 16:
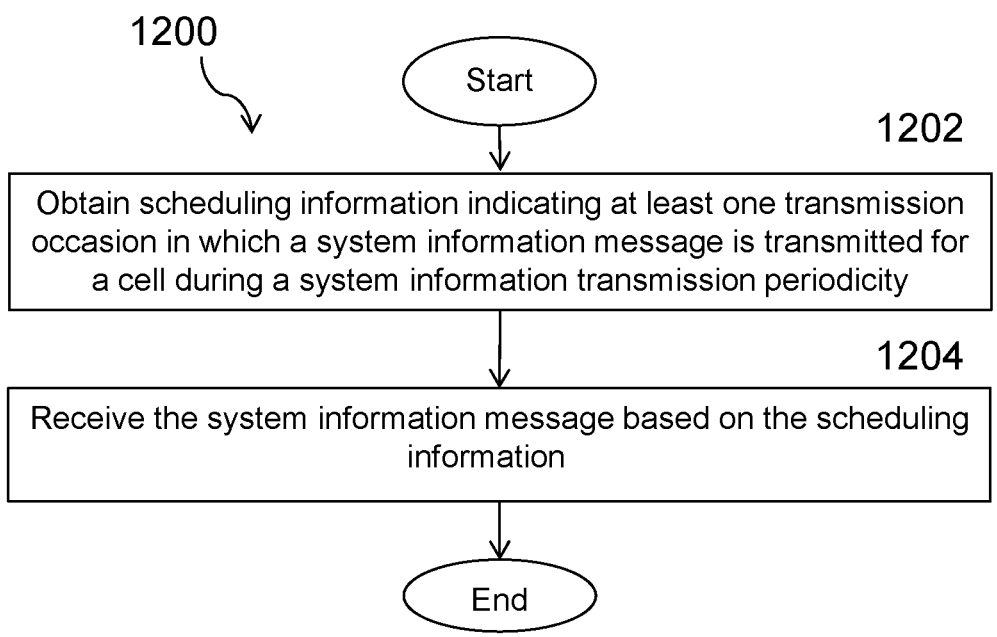
FIG. 16 illustrates another example method by a wireless device, according to certain embodiments.

FIG. 16 is a flow chart of another method 1200 in a wireless device 110 (e.g., a UE 200), in accordance with certain embodiments. The method 1200 begins at step 1202, where the wireless device obtains scheduling information indicating at least one transmission occasion in which a system information message is transmitted for a cell during a system information transmission periodicity. At step 1204, the wireless device 110 receives the system information message based on the scheduling information.

In a particular embodiment, the scheduling information comprises a bitmap. In a further particular embodiment, the bitmap comprises a common bitmap for a group of cells operating on a given carrier frequency. In a further particular embodiment, the bitmap is a function of cell-specific bitmaps of the group of cells.

In a further particular embodiment, the bitmap comprises a number of bits equal to a number of transmission occasions in which the system information message is transmitted within the system information transmission periodicity, and a bit value of each bit indicates whether the system information message is transmitted in a corresponding transmission occasion. For example, in a further particular embodiment, a bit value of 1 indicates that the system information message is transmitted in a corresponding transmission occasion, and a bit value of 0 indicates that the system information message is not transmitted in a corresponding transmission occasion. In yet another particular embodiment, a bit value of 0 indicates that the system information message is transmitted in a corresponding transmission occasion, and a bit value of 1 indicates that the system information message is not transmitted in a corresponding transmission occasion.

In a particular embodiment, the system information message comprises at least one of a MIB and a SIB. In a further particular embodiment, the system information message is a SIB1.

In a particular embodiment, obtaining the scheduling information comprises receiving the scheduling information from a first network node 160. In a further particular embodiment, the cell in which the system information message is transmitted is associated with the first network node and the first network node is a serving node. In a further particular embodiment, the cell in which the system information message is transmitted is associated with a second network node other than the first network node.

In a particular embodiment, the system information message is indicated by a PDCCH and the method further includes: determining that PDSCH scheduling information is transmitted by the PDCCH; receiving the PDSCH based on the PDSCH scheduling information; attempting to decode the PDSCH at a first transmission occasion of the at least one transmission occasions in which the system information message, is transmitted; in response to not decoding the PDSCH at the first transmission occasion, determining, based on the scheduling information, whether there are other transmission occasions in which the system information message is transmitted within the system information transmission periodicity.

In a further particular embodiment, the method includes storing one or more received PDSCH symbols in a buffer in response to determining that there is at least a second transmission occasion in which the system information message is transmitted within the system information transmission periodicity of the system information message. The wireless device 110 receives PDSCH in at least the second transmission occasion in which the system information message is transmitted within the system information transmission periodicity. The wireless device 110 then soft combines the stored one or more received PDSCH symbols with one or more PDSCH symbols received in at least the second message transmission occasion in which the system information message is transmitted and attempts to decode the PDSCH using the soft-combined PDSCH symbols.

In a further particular embodiment, in response to determining that the PDSCH cannot be decoded using the soft-combined PDSCH symbols, the wireless device 110 stores the one or more received PDSCH symbols and the one or more PDSCH symbols received in at least the second transmission occasion in the buffer.

In a still a further particular embodiment, the wireless device 110 determines, based on the scheduling information, that there are no other transmission occasions in which the system information message is transmitted within the system information transmission periodicity and determines whether or not to clear the buffer.

In a particular embodiment, the wireless device 110 determines, based on the scheduling information, that a number of transmission occasions in which the system information message is transmitted within the system information transmission periodicity is below a threshold. In response to determining that the number of transmission occasions in which the system information message is transmitted within the system information transmission periodicity is below the threshold, the wireless device 110 determines not to clear the buffer and/or acquiring the system information of the cell within a first time period.

In a particular embodiment, the wireless device 110 determines, based on the scheduling information, that a number of transmission occasions in which the system information message is transmitted within the system information transmission periodicity is above a threshold. In response to determining that the number of transmission occasions in which the system information message is transmitted within the system information transmission periodicity is above the threshold, the wireless device 110 determines to clear the buffer and/or acquiring the system information of the cell within a second time period wherein the second time period is shorter than the first time period.

In a further particular embodiment, the threshold is fixed.

In a further particular embodiment, the threshold is a function of one or more of: a system information message payload; a modulation and coding scheme; a transmission bandwidth; and a coding rate.

In a particular embodiment, the wireless device 110 acquires cell-specific system information scheduling information for a cell that is not serving the wireless device and uses the cell specific system information scheduling information for one or more tasks.

In a further particular embodiment, when acquiring the cell-specific system information scheduling information for the cell that is not serving the wireless device, the wireless device attempts to decode all possible transmission occasions where a system information message of the non-serving cell can be transmitted and creates a bit map indicating occasions when the system information message is transmitted.

In a particular embodiment, the cell for which scheduling information is obtained is a serving cell of the wireless device.

In a particular embodiment, the cell for which scheduling information is obtained is not a serving cell of the wireless device.

In a particular embodiment, the scheduling information comprising common scheduling information for two or more cells belonging to a same carrier frequency.

Figure 17:
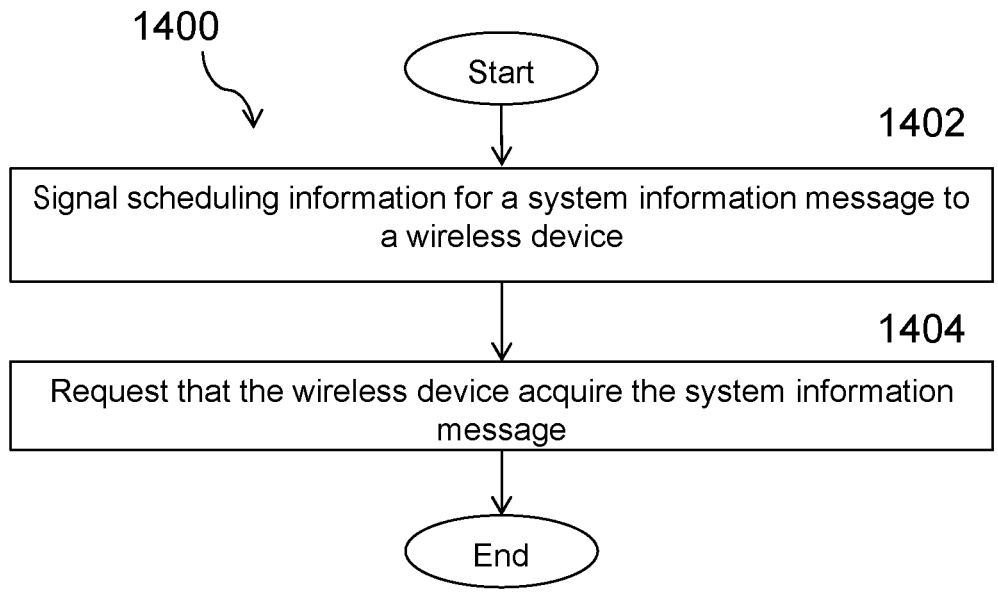
FIG. 17 illustrates an example method by a network node, according to certain embodiments.

FIG. 17 is a flow chart of a method 1400 in a network node 160, in accordance with certain embodiments. More particularly, FIG. 17 is a flow chart of a method 1400 performed by a network node for indicating system information transmission is disclosed. The method begins at step 1402, where the network node signals scheduling information for a system information message to a wireless device.

In certain embodiments, the system information message may comprise one of: a master information block (MIB); and a system information block (SIB). In certain embodiments, the system information message may be system information block type 1 (SIB1).

In certain embodiments, the scheduling information for the system information message may comprise: a transmission periodicity of the system information message; and a number of transmission occasions within the transmission periodicity of the system information message.

In certain embodiments, the method may further comprise determining the scheduling information for the system information message, wherein the scheduling information for the system information message is associated with at least one cell.

In certain embodiments, determining the scheduling information for the system information message may comprise obtaining system information scheduling information from one or more neighboring cells.

In certain embodiments, the scheduling information for the system information message may comprise common system information scheduling information for a group of cells operating on a given carrier frequency.

In certain embodiments, signaling the scheduling information for the system information message to the wireless device may comprise signaling an indication of the scheduling information for the system information message to the wireless device.

In certain embodiments, the indication of the scheduling information for the system information may comprise a system information message scheduling bitmap. The system information message scheduling bitmap may comprise a common system information message scheduling bitmap for a group of cells operating on a given carrier frequency. In certain embodiments, the system information message scheduling bitmap may be a function of cell-specific system information message scheduling bitmaps of the group of cells.

In certain embodiments, the system information message scheduling bitmap may comprise a number of bits equal to a number of system information message transmission occasions within the transmission periodicity of the system information message. A bit value of each bit may indicate whether the system information message is transmitted in a corresponding system information message transmission occasion. In certain embodiments, a bit value of 1 may indicate that the system information message is transmitted in a corresponding system information message transmission occasion. A bit value of 0 may indicate that the system information message is not transmitted in a corresponding system information message transmission occasion. In certain embodiments, a bit value of 0 may indicate that the system information message is transmitted in a corresponding system information message transmission occasion. A bit value of 1 may indicate that the system information message is not transmitted in a corresponding system information message transmission occasion.

In certain embodiments, the method may further comprise generating the indication of the determined scheduling information for the system information message.

In certain embodiments, the method may further comprise obtaining the indication of the determined scheduling information for the system information message from another network node.

In certain embodiments, the method may further comprise one or more of: obtaining scheduling information from a plurality of different network nodes; and obtaining scheduling information from one or more wireless devices.

In certain embodiments, the scheduling information for the system information message may be based on a type of service provided. In certain embodiments, the scheduling information for the system information message may be based on a type of deployment of a target cell. In certain embodiments, the scheduling information for the system information message may be based on a triggering event.

In certain embodiments, the scheduling information for the system information message may comprise an indication of whether the scheduling information for the system information message is the same as one or more neighboring cells. In certain embodiments, the scheduling information for the system information message may comprise an indication of whether the scheduling information is the same on one or more carrier frequencies as transmitted in a reference frequency.

In certain embodiments, the scheduling information for the system information message may be signaled to the wireless device using system information. In certain embodiments, the scheduling information for the system information message may be signaled to the wireless device in a wireless-device specific message.

In certain embodiments, the scheduling information for the system information message may indicate a number of transmission occasions within the transmission periodicity of the system information message that are used for transmitting the system information message. In certain embodiments, the scheduling information for the system information message may indicate a number of transmission occasions within the transmission periodicity of the system information message that are not used for transmitting the system information message.

In certain embodiments, the method may further comprise sending information about an amount of time that the signaled indication of the determined scheduling information is valid.

At step 1404, the network node requests that the wireless device acquire the system information message.

In certain embodiments, the request that the wireless device acquire the system information message may be associated with one of the following procedures: a CGI information report; RRC connection release with redirection to a carrier operating in a target cell; an ANR purpose; other system information message acquisition; a cell change; a positioning measurement; a system frame number and frame timing difference measurement; and reception of public warning system information.

In certain embodiments, the method may further comprise receiving a report from the wireless device, wherein the report is related to the acquired system information message.

In certain embodiments, the network node may be associated with a first cell, and the method may further comprise instructing the wireless device to acquire information about cell-specific system information scheduling information for a second cell.

In certain embodiments, the method may further comprise starting a timer after requesting that the wireless device acquire the system information message, wherein the timer corresponds to an amount of time in which the wireless device is expected to complete the request. A value of the timer may comprise a delay corresponding to a system information acquisition delay.

In certain embodiments, the method may further comprise: obtaining user data; and forwarding the user data to a host computer or a wireless device.

Figure 18:
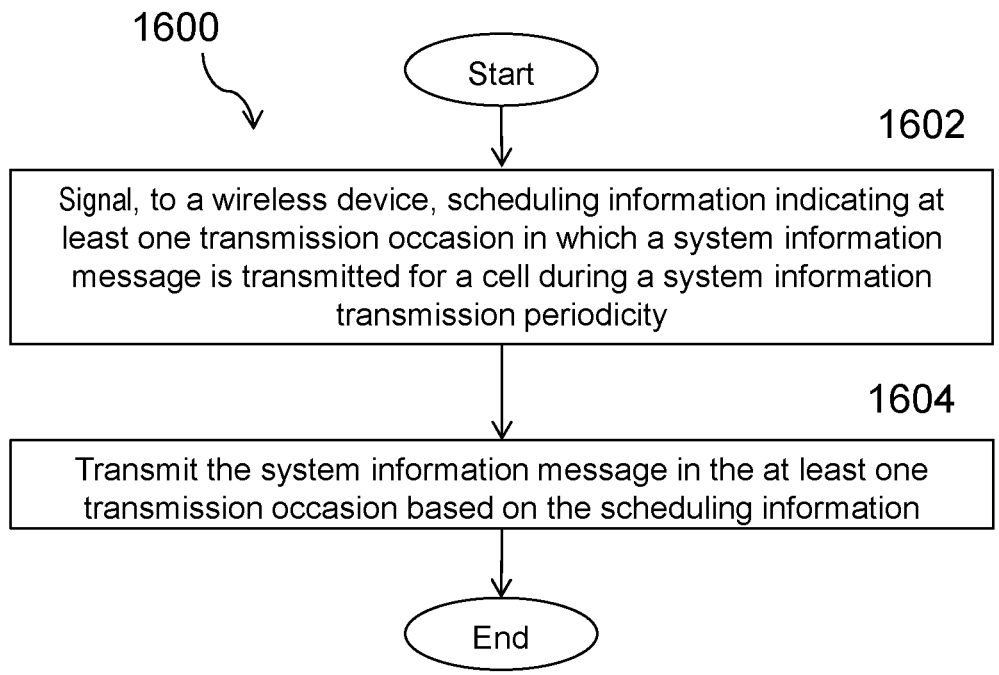
FIG. 18 illustrates another example method by a network node, according to certain embodiments.

FIG. 18 is a flow chart of another method 1600 in a network node 160, in accordance with certain embodiments. The method begins at step 1602, where the network node signals, to a wireless device 110, scheduling information indicating at least one transmission occasion in which a system information message is transmitted for a cell during a system information transmission periodicity. At step 1604, the network node transmits the system information message in the at least one transmission occasion based on the scheduling information. In a particular embodiment, the scheduling information comprises a bitmap. In a further particular embodiment, the bitmap comprises a common bitmap for a group of cells operating on a given carrier frequency. In a further particular embodiment, the bitmap is a function of cell-specific system information message scheduling bitmaps of the group of cells.

In a further particular embodiment, the bitmap comprises a number of bits equal to a number of transmission occasions in which the system information message is transmitted within the system information transmission periodicity, and a bit value of each bit indicates whether the system information message is transmitted in a corresponding transmission occasion. For example, in a further particular embodiment, a bit value of 1 indicates that the system information message is transmitted in a corresponding transmission occasion, and a bit value of 0 indicates that the system information message is not transmitted in a corresponding transmission occasion. As another example, in a particular embodiment, a bit value of 0 indicates that the system information message is transmitted in a corresponding transmission occasion, and a bit value of 1 indicates that the system information message is not transmitted in a corresponding transmission occasion.

In a particular embodiment, the scheduling information for the system information message comprises a number of transmission occasions in which the system information message is transmitted within the system information transmission periodicity.

In a particular embodiment, the system information scheduling information is determined based on system information scheduling information from one or more neighboring cells.

In a particular embodiment, the scheduling information for the system information message comprises common system information scheduling information for a group of cells operating on a given carrier frequency.

In a particular embodiment, the network node 160 performs at least one of: obtaining scheduling information from another network node 160; obtaining scheduling information from a plurality of different network nodes 160; and obtaining scheduling information from one or more wireless devices 110.

In a particular embodiment, the scheduling information indicating the at least one transmission occasion in which the system information message is transmitted is based on at least one of: a type of service provided; a type of deployment of a target cell; and a triggering event.

In a particular embodiment, the scheduling information comprises an indication of at least one of: whether the scheduling information for the system information message is the same as one or more neighboring cells; and whether the scheduling information is the same on one or more carrier frequencies as transmitted in a reference frequency.

In a particular embodiment, the scheduling information is signaled to the wireless device 110 using system information.

In a particular embodiment, the scheduling information is signaled to the wireless device 110 in a wireless-device specific message.

In a particular embodiment, the scheduling information indicates a number of transmission occasions within the system information transmission periodicity that are used for transmitting the system information message.

In a particular embodiment, the scheduling information indicates a number of transmission occasions within the system information transmission periodicity that are not used for transmitting the system information message.

In a particular embodiment, the network node 160 sends information about an amount of time that the scheduling information is valid.

In a particular embodiment, the network node 160 is associated with the cell, and the network node 160 instructs the wireless device 110 to acquire information about cell-specific system information scheduling information for another cell.

In a particular embodiment, the network node 160 transmits, to the wireless device 110, a request to acquire the system information and starts a timer after requesting that the wireless device 110 acquire the system information message. The timer corresponds to an amount of time in which the wireless device is expected to complete the request.

In a further particular embodiment, a value of the timer comprises a delay corresponding to a system information acquisition delay.

In a particular embodiment, the system information message comprises one of a MIB and a SIB. In a further particular embodiment, the system information message is a SIB1.

In a particular embodiment, the cell for which the scheduling information is transmitted is a serving cell of the wireless device 110.

In a particular embodiment, the cell for which the scheduling information is transmitted is not a serving cell of the wireless device 110.

Figure 19:
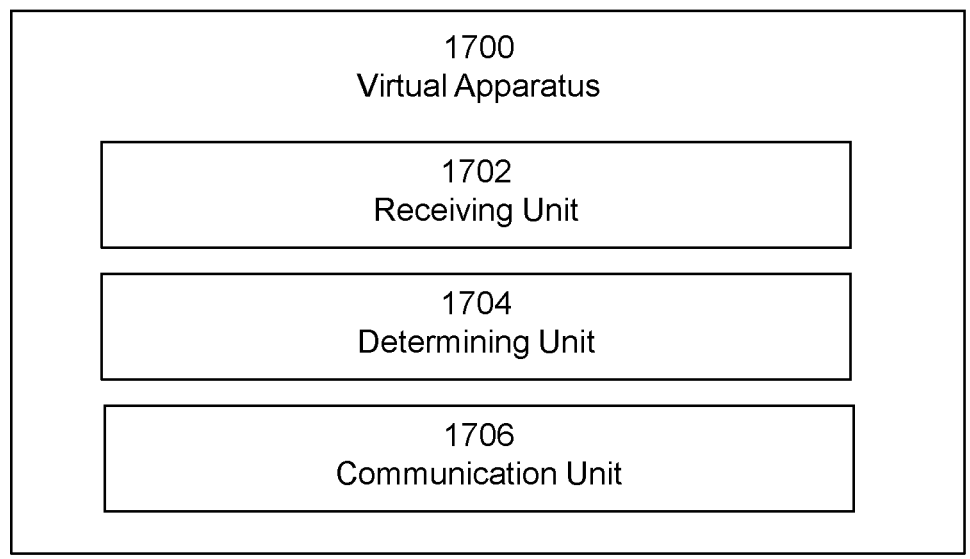
FIG. 19 illustrates an exemplary virtual computing device, according to certain embodiments.

FIG. 19 illustrates a schematic block diagram of an apparatus 1700 in a wireless network (for example, the wireless network shown in FIG. 8). The apparatus may be implemented in a network node (e.g., network node 160 shown in FIG. 8). Apparatus 1700 is operable to carry out any of the example methods described herein, such as the example methods described with reference to FIGS. 16, 17, 18, and 19 and possibly any other processes or methods disclosed herein. It is also to be understood that the method is not necessarily carried out solely by apparatus 1700. At least some operations of the method can be performed by one or more other entities.

Virtual Apparatus 1700 may comprise processing circuitry, which may include one or more microprocessor of microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, determining unit 1704, communication unit 1706, and any other suitable units of apparatus 1700 to perform corresponding functions according one or more embodiments of the present disclosure.

In certain embodiments, apparatus 1700 may be an eNB or a gNB. As illustrated in FIG. 19, apparatus 1700 includes receiving unit 1702, determining unit 1704, and communication unit 1706. Receiving unit 1702 may be configured to perform the receiving functions of apparatus 1700. For example, receiving unit 1702 may be configured to receive any suitable information (e.g., from another wireless device or a network node). Receiving unit 1702 may include a receiver and/or a transceiver, such as RF transceiver circuitry 172 described above in relation to FIG. 8. Receiving unit 1702 may include circuitry configured to receive messages and/or signals (wireless or wired). In particular embodiments, receiving unit 1702 may communicate received messages and/or signals to determining unit 1704 and/or any other suitable unit of apparatus 1700. The functions of receiving unit 1702 may, in certain embodiments, be performed in one or more distinct units.

For example, in a particular embodiment, receiving unit 1702 may be configured to obtain scheduling information for a system information message associated with a cell (e.g., a system information message scheduling bitmap).

As another example, in a particular embodiment, receiving unit 1702 may be configured to obtain scheduling information indicating at least one transmission occasion in which a system information message is transmitted for a cell during a system information transmission periodicity.

As another example, in a particular embodiment, receiving unit 1702 may be configured to obtain system information scheduling information from one or more neighboring cells. For instance, receiving unit 1702 may be configured to obtain scheduling information from a plurality of different network nodes and/or configured to obtain scheduling information from one or more wireless devices. As another example, receiving unit 1702 may be configured to obtain an indication of the scheduling information for the system information message from another network node. As still another example, receiving unit 1702 may be configured to receive a report from the wireless device, wherein the report is related to the acquired system information message. As yet another example, receiving unit 1702 may be configured to obtain user data.

For instance, receiving unit 1702 may be configured to receive the scheduling information from a first cell. As another example, receiving unit 1702 may be configured to receive the system information message based on the obtained scheduling information. As still another example, receiving unit 1702 may be configured to receive a system information message acquisition request. As yet another example, receiving unit 1702 may be configured to receive PDSCH. As another example, receiving unit 1702 may be configured to acquire cell-specific system information scheduling information for a cell that is not serving the wireless device.

Determining unit 1704 may include or be included in one or more processors, such as processing circuitry 120 described above in relation to FIG. 8. Determining unit 1704 may include analog and/or digital circuitry configured to perform any of the functions of determining unit 1704 and/or processing circuitry 120 and/or processing circuitry 170 described above. The functions of determining unit 1704 may, in certain embodiments, be performed in one or more distinct units. Determining unit 1704 may perform the processing functions of apparatus 1700.

For example, in a particular embodiment, determining unit 1704 may be configured to obtain scheduling information for a system information message associated with a cell (e.g., a system information message scheduling bitmap). As another example, determining unit 1704 may be configured to determine to acquire the system information message (e.g., in response to receiving a system information message acquisition request or autonomously in response to a trigger such as a cell re-selection procedure or a RRC connection re-establishment).

As another example, determining unit 1704 may be configured to decode PDCCH for the system information message according to the scheduling information. Determining unit 1704 may be configured to determine that PDSCH scheduling information is included in the PDCCH. Determining unit 1704 may be configured to attempt to decode the PDSCH at a first system information message transmission occasion. Determining unit 1704 may be configured to, in response to decoding the PDSCH at the first system information message transmission occasion, acquire the system information message. Determining unit 1704 may be configured to, in response to not decoding the PDSCH at the first system information message transmission occasion, determine whether there are other system information message transmission occasions within a transmission periodicity of the system information message. Determining unit 1704 may be configured to, in response to determining that there are other system information message transmission occasions within the transmission periodicity of the system information message, store one or more received PDSCH symbols in a buffer. Determining unit 1704 may be configured to receive PDSCH in a subsequent system information message transmission occasion within the transmission periodicity of the system information message, soft combine the stored one or more received PDSCH symbols with one or more PDSCH symbols received in the subsequent system information message transmission occasion, and attempt to decode the PDSCH using the soft-combined PDSCH symbols. Determining unit 1704 may be configured to, in response to determining that the PDSCH cannot be decoded using the soft-combined PDSCH symbols, store the one or more received PDSCH symbols and the one or more PDSCH symbols received in the subsequent system information message transmission occasion in the buffer. Determining unit 1704 may be configured to determine that there are no other system information message transmission occasions within the transmission periodicity of the system information message and to determine whether or not to clear the buffer (e.g., based on the obtained scheduling information). As one example, determining unit 1704 may be configured to determine, based on the obtained scheduling information, that a number of system information message transmission occasions within the transmission periodicity of the system information message is below a threshold. Determining unit 1704 may be configured to, in response to determining that the number of system information message transmission occasions within the transmission periodicity of the system information is below the threshold, determine not to clear the buffer. As another example, determining unit 1704 may be configured to determine, based on the obtained scheduling information, that a number of system information message transmission occasions within the transmission periodicity of the system information message is above a threshold. Determining unit 1704 may be configured to, in response to determining that the number of system information message transmission occasions within the transmission periodicity of the system information is above the threshold, determine to clear the buffer.

As yet another example, determining unit 1704 may be configured to acquire cell-specific system information scheduling information for a cell that is not serving the wireless device and to use the acquired cell specific system information scheduling information for one or more tasks. For instance, determining unit 1704 may be configured to attempt to decode all possible occasions where a system information message of the non-serving cell can be transmitted and to create a bit map indicating occasions when the system information message is transmitted.

As yet another example, determining unit 1704 may be configured to determine scheduling information for the system information message (e.g., a transmission periodicity of the system information message and a number of transmission occasions within the transmission periodicity of the system information message). The scheduling information for the system information message may be associated with at least one cell. Determining unit 1704 may be configured to determine the scheduling information for the system information message based on, for example, one or more of: a type of service provided; a type of deployment of a target cell; a triggering event. As another example, determining unit 1504 may be configured to obtain system information scheduling information from one or more neighboring cells. As still another example, determining unit 1504 may be configured to generate an indication of the determined scheduling information for the system information message (e.g., a system information message scheduling bitmap). As yet another example, determining unit 1704 may be configured to obtain the indication of the determined scheduling information for the system information message from another network node. As another example, determining unit 1704 may be configured to request that the wireless device acquire the system information message.

As another example, in certain embodiments apparatus 1700 may be associated with a first cell, and determining unit 1704 may be configured to instruct the wireless device to acquire information about cell-specific system information scheduling information for a second cell.

As another example, determining unit 1704 may be configured to start a timer after requesting that the wireless device acquire the system information message, wherein the timer corresponds to an amount of time in which the wireless device is expected to complete the request.

As another example, determining unit 1704 may be configured to obtain user data.

Communication unit 1706 may transmit messages (e.g., to another wireless device and/or a network node). Communication unit 1706 may include a transmitter and/or a transceiver, such as RF transceiver circuitry 122 described above in relation to FIG. 8 and/or RF transceiver circuitry 172 described above in relation to FIG. 9. Communication unit 1706 may include circuitry configured to transmit messages and/or signals (e.g., through wireless or wired means). In particular embodiments, communication unit 1706 may receive messages and/or signals for transmission from determining unit 1704 or any other unit of apparatus 1700. The functions of communication unit 1704 may, in certain embodiments, be performed in one or more distinct units.

Communication unit 1706 may be configured to perform the transmission functions of apparatus 1700. For example, communication unit 1706 may be configured to report the received system information message. As another example, communication unit 1706 may be configured to forward the user data to a host computer via a transmission to a network node.

As another example, in a particular embodiment, communication unit 1706 may be configured to receive scheduling information indicating at least one transmission occasion in which a system information message is transmitted for a cell during a system information transmission periodicity.

As another example, communication unit 1706 may be configured to receive the system information message based on the scheduling information.

For example, in a particular embodiment, communication unit 1706 may be configured to signal scheduling information for a system information message to a wireless device 110. For instance, communication unit 1706 may be configured to signal an indication of the scheduling information for the system information message to the wireless device. As another example, communication unit 1706 may be configured to send information about an amount of time that the signaled scheduling information is valid. As still another example, communication unit 1706 may be configured to request that the wireless device acquire the system information message. As yet another example, communication unit 1706 may be configured to instruct the wireless device to acquire information about cell-specific system information scheduling information for a second cell. As another example, communication unit 1506 may be configured to forward user data to a host computer or a wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

The invention claimed is:

1. A method by a wireless device, the method comprising:
   obtaining scheduling information indicating at least one transmission occasion in which a system information message is transmitted for a cell during a system information transmission periodicity; and
   receiving the system information message based on the scheduling information, wherein the system information message is indicated by a Physical Downlink Control Channel (PDCCH) and the method further comprises:
   determining that Physical Downlink Shared Channel (PDSCH) scheduling information is transmitted by the PDCCH;
   receiving the PDSCH based on the PDSCH scheduling information;
   attempting to decode the PDSCH at a first transmission occasion of the at least one transmission occasions in which the system information message is transmitted; and
   in response to not decoding the PDSCH at the first transmission occasion, determining, based on the scheduling information, whether there are other transmission occasions in which the system information message is transmitted within the system information transmission periodicity.

2. The method of claim 1, wherein the scheduling information comprises a bitmap.

3. The method of claim 1, wherein obtaining the scheduling information comprises receiving the scheduling information from a serving network node, wherein the cell in which the system information message is transmitted is associated with the serving network node.

4. The method of claim 1, further comprising:
   in response to determining that there is at least a second transmission occasion in which the system information message is transmitted within the system information transmission periodicity of the system information message, storing one or more received PDSCH symbols in a buffer;
   receiving PDSCH in at least the second transmission occasion in which the system information message is transmitted within the system information transmission periodicity;
   soft combining the stored one or more received PDSCH symbols with one or more PDSCH symbols received in at least the second message transmission occasion in which the system information message is transmitted; and attempting to decode the PDSCH using the soft-combined PDSCH symbols.

5. The method of claim 4, further comprising:

in response to determining that the PDSCH cannot be decoded using the soft-combined PDSCH symbols, storing the one or more received PDSCH symbols and the one or more PDSCH symbols received in at least the second transmission occasion in the buffer.

6. The method of claim 5, further comprising:

determining, based on the scheduling information, that there are no other transmission occasions in which the system information message is transmitted within the system information transmission periodicity; and determining whether or not to clear the buffer.

7. A wireless device comprising:

processing circuitry configured to:

obtain scheduling information indicating at least one transmission occasion in which a system information message is transmitted for a cell during a system information transmission periodicity; and receive the system information message based on the obtained scheduling information, wherein the system information message is indicated by a Physical Downlink Control Channel (PDCCH) and the processing circuitry is further configured to:

determine that Physical Downlink Shared Channel (PDSCH) scheduling information is transmitted by the PDCCH;

receive the PDSCH based on the PDSCH scheduling information;

attempt to decode the PDSCH at a first transmission occasion of the at least one transmission occasions in which the system information message is transmitted; and in response to not decoding the PDSCH at the first transmission occasion, determine, based on the scheduling information, whether there are other transmission occasions in which the system information message is transmitted within the system information transmission periodicity.

8. A method by a network node, the method comprising:

signalling, to a wireless device, scheduling information indicating at least one transmission occasion in which a system information message is transmitted for a cell during a system information transmission periodicity, wherein the scheduling information for the system information message comprise a transmission periodicity of the system information message and a number of transmission occasions within the transmission periodicity of the system information message; and transmitting the system information message in the at least one transmission occasion based on the scheduling information, wherein the system information scheduling information is determined based on system information scheduling information from one or more neighboring cells, and wherein the system information message is indicated by a Physical Downlink Control Channel (PDCCH) and the method further comprises:

transmitting Physical Downlink Shared Channel (PDSCH) scheduling information by the PDCCH;

encoding the system information message in the PDSCH at a first transmission occasion of the at least one transmission occasions; and transmitting PDSCH on one or more transmission occasions based on the PDSCH scheduling information.

9. The method of claim 8, wherein the scheduling information comprises a bitmap.

10. The method of claim 8, wherein the scheduling information for the system information message comprises a number of transmission occasions in which the system information message is transmitted within the system information transmission periodicity.

11. The method of claim 8, wherein the scheduling information for the system information message comprises common system information scheduling information for a group of cells operating on a given carrier frequency.

12. The method of claim 8, further comprising at least one of:

obtaining scheduling information from another network node;

obtaining scheduling information from a plurality of different network nodes; and obtaining scheduling information from one or more wireless devices.

13. The method of claim 8, wherein the scheduling information indicating the at least one transmission occasion in which the system information message is transmitted is based on at least one of:

a type of service provided;

a type of deployment of a target cell; and a triggering event.

14. The method of claim 8, wherein the scheduling information indicates a number of transmission occasions within the system information transmission periodicity that are used for transmitting the system information message.

15. The method of claim 8, wherein the scheduling information indicates a number of transmission occasions within the system information transmission periodicity that are not used for transmitting the system information message.

16. The method of claim 8, further comprising:

sending information about an amount of time that the scheduling information is valid.

17. A network node comprising:

processing circuitry configured to:

signal, to a wireless device, scheduling information indicating at least one transmission occasion in which a system information message is transmitted for a cell during a system information transmission periodicity, wherein the scheduling information for the system information message comprise a transmission periodicity of the system information message and a number of transmission occasions within the transmission periodicity of the system information message; and transmit the system information message in the at least one transmission occasion based on the scheduling information, wherein the system information scheduling information is determined based on system information scheduling information from one or more neighboring cells, and wherein the system information message is indicated by a Physical Downlink Control Channel (PDCCH) and the processing circuitry is further configured to:

transmit Physical Downlink Shared Channel (PDSCH) scheduling information by the PDCCH;

encode the system information message in the PDSCH at a first transmission occasion of the at least one transmission occasions; and transmit PDSCH on one or more transmission occasions based on the PDSCH scheduling information.

* * * * *